(12) United States Patent
Livshits et al.

(10) Patent No.: US 10,958,737 B2
(45) Date of Patent: Mar. 23, 2021

(54) SYSTEMS AND METHODS FOR DISTRIBUTING CONTENT

(71) Applicant: Synamedia Limited, Staines Upon Thames (GB)

(72) Inventors: David Livshits, Geva Binyamin (IL); Vered Anikster, Jerusalem (IL)

(73) Assignee: SYNAMEDIA LIMITED, Staines upon Thames (GB)

( * ) Notice: Subject to any disclaimer, the term of this patent is extended or adjusted under 35 U.S.C. 154(b) by 73 days.

(21) Appl. No.: 16/397,261

(22) Filed: Apr. 29, 2019

(65) Prior Publication Data
US 2020/0344307 A1    Oct. 29, 2020

(51) Int. Cl.
| | |
|---|---|
| *H04L 29/08* | (2006.01) |
| *H04N 21/81* | (2011.01) |
| *H04N 21/2662* | (2011.01) |
| *H04L 29/06* | (2006.01) |

(52) U.S. Cl.
CPC ............ *H04L 67/146* (2013.01); *H04L 67/02* (2013.01); *H04L 67/32* (2013.01); *H04N 21/2662* (2013.01); *H04N 21/812* (2013.01); *H04L 63/08* (2013.01)

(58) Field of Classification Search
CPC ............ G06Q 30/0277; H04L 67/2814; G06F 16/9566; G06F 21/566
See application file for complete search history.

(56) References Cited

U.S. PATENT DOCUMENTS

| | | | |
|---|---|---|---|
| 8,060,616 B1 | 11/2011 | Richardson et al. | |
| 8,060,996 B2 | 11/2011 | Rojdev et al. | |
| 10,182,096 B1 * | 1/2019 | Siddiqi | ............... H04L 65/4084 |
| 2008/0097915 A1 | 4/2008 | Golan et al. | |
| 2008/0319862 A1 | 12/2008 | Golan et al. | |
| 2010/0008421 A1 | 1/2010 | Gutman et al. | |
| 2011/0116636 A1 | 5/2011 | Steed | |
| 2012/0005365 A1 | 1/2012 | Ma et al. | |
| 2014/0278992 A1 | 9/2014 | Roundtree et al. | |

(Continued)

OTHER PUBLICATIONS

Adobe Systems Incorporated. "Adobe Primetime Ad Insertion: Make every screen a TV." Datasheet. Printed Aug. 2015. Copyright 2015. (2 pages).

(Continued)

*Primary Examiner* — William G Trost, IV
*Assistant Examiner* — Christopher P Cadorna
(74) *Attorney, Agent, or Firm* — Finnegan, Henderson, Farabow, Garrett & Dunner, LLP

(57) ABSTRACT

A system for multimedia content delivery includes one or more processors; and a storage medium storing instructions. When executed, the instructions may configure the one or more processors to perform operations including: delivering to a set of client devices a manifest including fake segment URLs; receiving, from a client device, a segment request including a client ID and a requested URL. The method may also include selecting content for the at least one of the client devices based on the client ID when determining the requested URL is unavailable; redirecting the segment request to a content address associated with the selected content; and providing the selected content to the at least one of the client devices.

20 Claims, 11 Drawing Sheets

(56) References Cited

U.S. PATENT DOCUMENTS

| | | | |
|---|---|---|---|
| 2015/0350179 A1* | 12/2015 | Kobayashi | H04L 9/3273 |
| | | | 726/4 |
| 2016/0127440 A1* | 5/2016 | Gordon | H04N 21/23439 |
| | | | 709/219 |
| 2016/0140618 A1 | 5/2016 | Duggal et al. | |
| 2016/0253718 A1* | 9/2016 | Carasso | H04L 63/029 |
| | | | 705/14.73 |
| 2016/0301735 A1* | 10/2016 | Lind | H04M 15/8083 |
| 2016/0359945 A1 | 12/2016 | Boudville | |
| 2018/0097864 A1* | 4/2018 | Brinkley | H04L 65/608 |
| 2018/0101507 A1* | 4/2018 | Malca | G06F 40/14 |
| 2019/0220577 A1* | 7/2019 | Anikster | H04L 67/2842 |

OTHER PUBLICATIONS

Imagine Communications. "Dynamic Ad Insertion: The Foundations of a Multiscreen Profit Center." eBook. Copyright 2016 (12 pages).

* cited by examiner

1100

```
#EXTM3U
#EXT-X-PLAYLIST-TYPE:VOD
#EXT-X-TARGETDURATION:10
#EXT-X-VERSION:4
#EXT-X-MEDIA-SEQUENCE:0
#EXTINF:10.0,
http://example.com/movie1/fileSequenceA.ts
#EXTINF:10.0,
http://example.com/movie1/fileSequenceB.ts
#EXTINF:10.0,
http://example.com/movie1/fileSequenceC.ts
#EXTINF:10.0,
http://example.com/movie1/fileSequenceD.ts
#EXT-X-ENDLIST
#EXT-X-TARGETDURATION:10
#EXT-X-VERSION:4
#EXT-X-MEDIA-SEQUENCE:0
#EXTINF:10.0,
ad0.ts
#EXTINF:8.0,
ad1.ts
#EXTINF:10.0,
movieA.ts
#EXTINF:10.0,
movieB.ts
```

SYSTEMS AND METHODS FOR DISTRIBUTING CONTENT

TECHNICAL FIELD

The present disclosure relates generally to systems and methods for distributing multimedia content, and more particularly, to systems and methods for secure and dynamic targeted content insertion in multimedia delivered to client devices.

BACKGROUND

Over the top (OTT) services refer to multimedia content providers that stream content directly to viewers over the Internet, bypassing telecommunications, multichannel television, and broadcast television platforms that traditionally act as a content controller or distributor. Users have widely embraced OTT services, like web-based video on demand services, as alternatives to traditional multimedia platforms. Indeed, the adoption of OTT services has displaced traditional platforms. Thus, content developers and content broadcasters are now seeking to monetize OTT services to recoup lost revenue and capitalize on the new market.

Developers and broadcasters have turned to dynamic advertisement insertion (DAI) to generate revenue from OTT services while still providing a personalized user experience. DAI is a technology that enables advertisers to selectively reach consumers and provide personalized advertisement content. Using DAI, advertisers can identify and provide content that is more relevant for a customer, or group of customers, based on demographics, geographic location, and/or user profiles. For example, DAI allows OTT services to dynamically identify advertisements that are relevant for a user and insert them in the main content. By "stitching" advertisements in the main content, OTT services can generate revenue using traditional advertising models and continue to provide customized content. For example, DAI allows OTT services to include advertisements throughout the main content and charge according to the number of delivered advertisements. But, in addition, DAI enables OTT services to dynamically select and deliver advertisements for target customers, potentially enhancing customer's response.

DAI, however, faces important challenges that undermine the financial viability of some OTT services models. First, users are sometimes able to skip advertisements in their devices. For example, users may employ multimedia players that allow fast forwarding of content. Second, the proliferation of advertisement blocking methods and software jeopardizes the revenue and business model of OTT services. With advertisement blockers users can configure their devices to avoid receiving advertisements. For example, client devices may install web browser extensions that block advertisement content and/or prevent advertisement content display. Further, client devices and/or routers may be configured to implement firewalls and filters that block content from addresses associated with advertisers. These methods to block or skip advertisements interfere with DAI operation and jeopardize OTT services revenue because revenue from advertisements is normally based on the number of advertisements that are viewed completely by the users. Therefore, mechanisms that block and hide advertisements undermine the DAI operation and may significantly decrease the revenue of OTT services.

The disclosed systems and methods for providing multimedia content to client devices address one or more of the problems set forth above and/or other problems in the prior art.

BRIEF DESCRIPTION OF THE DRAWINGS

The accompanying drawings, which are incorporated in and constitute a part of this specification, illustrate disclosed embodiments and, together with the description, serve to explain the disclosed embodiments. In the drawings:

FIG. 11 is an exemplary source code for a manifest configuration, consistent with disclosed embodiments.

DETAILED DESCRIPTION

Overview

Figure 1:
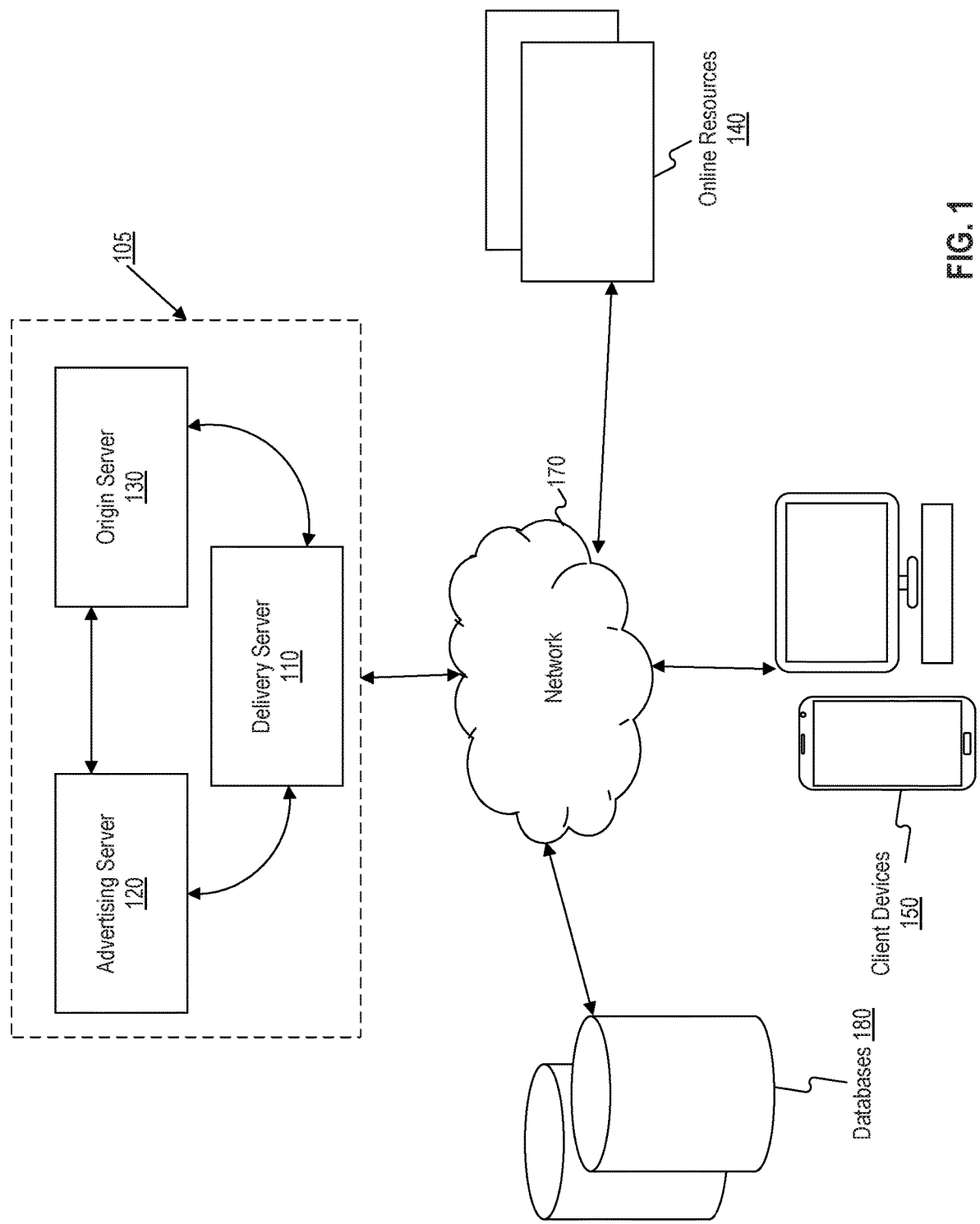
FIG. 1 is a block diagram of an exemplary system, consistent with disclosed embodiments.

One aspect of the present disclosure is directed to a system for multimedia content delivery including one or more processors; and a storage medium storing instructions. When executed by the one or more processors, the instructions enable the system to perform operations including: delivering to a set of client devices a manifest including fake segment URLs; receiving, from a client device, a segment request including a client ID and a requested URL; selecting content for the at least one of the client devices based on the client ID when determining the requested URL is unavailable; redirecting the segment request to a content address associated with the selected content; and providing the selected content to the at least one of the client devices.

Another aspect of the present disclosure is directed to a non-transitory computer-readable medium storing instructions that, when executed by a processor, cause the processor to operate a system for multimedia content delivery. The operations may include: delivering to a set of client devices a manifest including fake segment URLs; receiving, from a client device, a segment request including a client ID and a requested URL; selecting content for the at least one of the client devices based on the client ID when determining the requested URL is unavailable; redirecting the segment request to a content address associated with the selected content; and providing the selected content to the at least one of the client devices.

Yet another aspect of the present disclosure is directed to a computer-implemented method for multimedia content delivery. The method may include delivering to a set of client devices a manifest including fake segment URLs; receiving, from a client device, a segment request including a client ID and a requested URL; selecting content for the at least one of the client devices based on the client ID when determining the requested URL is unavailable; redirecting the segment request to a content address associated with the selected content; and providing the selected content to the at least one of the client devices.

Description

The disclosure is generally directed to systems and methods that prevent advertisement blocking, skipping, and/or replacing when providing multimedia content to client devices. In some embodiments, the disclosed systems and methods improve the DAI operation by eliminating advertisement indications or digital signatures in multimedia content that are normally exploited for advertisement interference. For example, the disclosed systems and methods may eliminate advertising indicators to prevent advertisement blockers from identifying advertisement sections. Advertisement blockers may include software implementing blacklists, whitelists, and/or expression filters. Advertisement blockers may also include security software, with advertising disabling features, or intermediaries that filter advertisement content. Moreover, the disclosed systems and methods may be used to impede the operation of advertisement blockers implemented with, for example, browser integration, external programs, DNS manipulation/filtering, recursive local VPNs, and/or hardware devices. Further, the disclosed systems and methods may also enhance communication security during content delivery and improve user experience by minimizing latency during content streaming. The disclosed systems and methods can also be easily integrated with existing content delivery infrastructure.

Multimedia content is frequently transmitted to client devices in multiple segments. In this description, segments may refer to, for example, content segments (such as HLS segments), information chunks (such as PNG, IFF, MP3 and/or AVI files), and/or media fragments (including, among others, URI fragments, URI queries, HTML5 fragments, and/or CSS3 fragments) etc. Advertising blockers frequently identify advertising segments, fragments, or chunks, by comparing digital signatures between different clients and/or by recognizing addresses of advertisement servers. For example, advertisement blockers can compare signatures in web manifests (JavaScript Object Notation files that provide information about web applications and instructions on how to operate) between different clients to identify when advertising segments will be displayed. Further, advertisement blockers may identify advertising segments based on a uniform resource locator (URL) or an IP address of an advertiser server.

To prevent the identification and blocking of the advertising segment, the disclosed methods and systems enable content delivery without providing digital signatures. Then, the client device may not have any indication of when the advertising segments are being provided and cannot block them. For example, some embodiments of the disclosed methods include initializing the system by delivering a manifest to each user that has the same digital signatures and/or an identical content. Regardless of whether different users have different personalized advertisements, or there are users exempt of advertisements, each user receives a manifest that is indistinguishable between users. In such embodiments, the manifest may include a master web manifest describing information about the website or the application. For example, the manifest may include a legitimate master web manifest configured to be executed by standard browsers and CDNs. Alternatively, or additionally, the manifest may include, for example, an appcache-manifest, a web app manifest, a video streaming manifest, a webpack manifest, a plugin manifest, a splitchunks manifest, or similar scripts. In yet other embodiments, the manifest may also include, for example, an extension manifest.

Because, in some embodiments, manifests are configured so there are no digital signatures that can be identified by the client devices, advertisement blockers cannot recognize advertising content and cannot block it. Additionally, or alternatively, in the disclosed systems and methods advertisements may be delivered using addresses that cannot be isolated or differentiated from the main content.

While avoiding advertisement blocking, some embodiments of the disclosed systems and methods still allow delivery of personalized content, taking full advantage of DAI technology. In some embodiments the disclosed systems and methods allow identifying user requests by appending an identifier to requests from client devices. This identifier may be used by a content delivery server to select customized content. Thus, even if there is not personalized signaling within the content request, the server may identify the client, decide what kind of content should be delivered, and redirect the request to the selected content. In such embodiments, the redirection of requests may be implemented within the server using common redirection processes. Thus, the disclosed systems and methods provide a scalable and affordable content delivery method that can be easily integrated into existing content delivery infrastructure. Further, in some embodiments, the redirection that allows the identification of personalized content may be secured by including fake segment URLs in the manifest delivered to client devices. Including fake segment URLs in the manifest may guarantee that the all user requests will go through the redirection process. For example, a master web manifest may include fake segment URLs, such as invalid URLs, URLs encoded to have missing elements, or URLs pointing to nonexistent locations. In such embodiments, client segment requests may be configured to include one or more fake segment URLs that result in redirections within the server to identify and provide personalized content.

The disclosed systems and methods may be applicable to multiple content delivery schemes and may be adaptable to different delivery infrastructures. For example, the disclosed systems and methods can be used with multiple encoding, encryption, and packaging technologies. In some embodiments, the disclosed methods may be applied to constant Bitrate (CBR), average bitrate (ABR) and variable bitrate (VBR) encodings. Moreover, the disclosed methods may be employed with multiple packaging technologies such as Common Media Application Format (CMAF), MPEG-DASH, HTTP Live Streaming (HLS), among others. Further, the disclosed systems and methods may be independent of the streaming mode used by the client. In some embodiments, the disclosed methods can be used regardless of whether the user employed segment number, time offset, or byte-range. Moreover, the disclosed systems and methods can be integrated with any advertising management solution and does not require proprietary software development kit (SDK) or other integration on the client platform and the content delivery server. Further, the disclosed systems and methods can operate with any version of HTTP(s) and caching protocols. In such embodiments, therefore, there is no need for an additional client server content flow bypassing content delivery network (CDN) infrastructure that may require deployment of dedicated servers. In some embodiments, the disclosed methods may not require specific web manifest manipulation and has no constraint for using SegmentList-based manifests.

Moreover, the disclosed systems and methods may reduce security risks during content delivery. For example, in some embodiments of the disclosed systems and methods requests may go over HTTPs to prevent man in the middle attacks. Further, to reduce exposure of client information in requested segments, which may result in phishing or similar attacks, the disclosed systems and methods may avoid HTTP redirection flow between clients and the content delivery server. Further, the disclosed systems and methods may provide protection against manipulations of the client credentials or identification to gain OTT service without valid privileges. For example, in some embodiments, server-side filters may be used to reject requests with tampered or suspicious client identification. Further, the disclosed systems may allow keeping records of client identification and licensing information, which may be used to reveal inconsistencies associated with DAI attacks.

Furthermore, the disclosed systems and methods may reduce latency and improve user experience by employing architectures that use server caching capabilities. Using cache capabilities within servers, such as an edge CDN server, may allow reducing content traffic flow to minimize latency. For example, in the disclosed systems and methods principal and advertising content may be prepared and preloaded in CDN servers close to client devices thereby improving response times. Such arrangement of data enables redirection operations to content and advertising segments with minimal latency for the user.

The disclosed systems and methods improve the technical field of providing multimedia content to client devices and solve technical problems associated with advertisement blocking. In some embodiments, the disclosed systems and methods modify the conventional operation of content delivery servers with a redirection scheme that avoids using unique signatures to prevent advertising blocking attacks. In addition, the disclosed methods and systems may improve the reliability and efficiency of multimedia content delivery by passing off content loads to the servers with the fastest response to client requests. The arrangement in the disclosed system may improve the resource utilization and minimize computer expenditures. These features not only result in more efficient systems that improve delivery of multimedia content, they also enhance user experience, reduce processing requirements in mobile devices, and prevent security exploits.

Reference will now be made in detail to the disclosed embodiments, examples of which are illustrated in the accompanying drawings.

FIG. 1 is a block diagram of an exemplary system 100, consistent with disclosed embodiments. In system 100 a content provider, such as an OTT service, may provide principal and advertisement content to clients in response to client requests. System 100 may include a content delivery system 105 which may include a delivery server 110, an advertising server 120, and an origin server 130. System 100 may additionally include online resources 140, client devices 150, and databases 180. In some embodiments, as shown in FIG. 1, components of system 100 may be connected to a network 170. However, in other embodiments components of system 100 may be connected directly with each other, without network 170. For example, databases 180 may be directly coupled to content delivery system 105.

Online resources 140 may include one or more servers or storage services provided by an entity such as a provider of website hosting, networking, cloud, or backup services. In some embodiments, online resources 140 may be associated with hosting services or servers that store web pages for authentication services, Domain Name System (DNS), or landing pages for OTT services. In other embodiments, online resources 140 may be associated with a cloud computing service such as Amazon Web Services™. In yet other embodiments, online resources 140 may be associated with a messaging service, such as, for example, Apple Push Notification Service, Azure Mobile Services, or Google Cloud Messaging. In such embodiments, online resources 140 may handle the delivery of messages and notifications related to functions of the disclosed embodiments, such as handling digital rights management.

Client devices 150 may include one or more computing devices configured to perform one or more operations consistent with disclosed embodiments. For example, client devices 150 may include a desktop computer, a laptop, a server, a mobile device (e.g., tablet, smart phone, etc.), a set-top box, a gaming device, a wearable computing device, or other type of computing device. Client devices 150 may include one or more processors configured to execute software instructions stored in memory, such as memory included in client devices 150, to perform operations to implement the functions described below. Client devices 150 may be configured for wired and/or wireless communications and may include software that when executed by a processor performs internet-related communication (e.g., TCP/IP) and content display processes. For instance, client devices 150 may execute browser software that generates and displays interfaces including content on a display device included in, or connected to, client devices 150. Client devices 150 may execute applications that allow client devices 150 to communicate with components over network 170, and generate and display content in interfaces via display devices included in client devices 150. For example, client devices may display a media player to output content received from content delivery system 105.

The disclosed embodiments are not limited to any particular configuration of client devices 150. For instance, a client device 150 may be a mobile device that stores and executes mobile applications to perform operations that provide functions offered by content delivery system 105 and/or online resources 140. In certain embodiments, client devices 150 may be configured to execute software instructions relating to location services, such as GPS locations. For example, client devices 150 may be configured to determine a geographic location and provide location data and time stamp data corresponding to the location data. Client devices 150 are further described in connection with FIG. 6.

Databases 180 may include one or more computing devices configured with appropriate software to perform operations consistent with providing content delivery system 105, advertising server 120, and origin server 130 data for performing transactions with client devices 150. Databases 180 may include, for example, Oracle™ databases, Sybase™ databases, or other relational databases or non-relational databases, such as Hadoop™ sequence files, HBase™, or Cassandra™ Databases 180 may include computing components (e.g., database management system, database server, etc.) configured to receive and process requests for data stored in memory devices of the database(s) and to provide data from the database(s).

While databases 180 are shown separately, in some embodiments databases 180 may be included in, or otherwise related to, one or more of content delivery system 105, delivery server 110, advertising server 120, origin server 130, and online resources 140.

Databases 180 may be configured to collect and/or maintain the data associated with user accounts and user preferences. For example, databases 180 may store information about user privileges and advertising profiles for users of content delivery system 105. Databases 180 may collect the data from a variety of sources, including, for instance, online resources 140. Databases 180 are further described below in connection with FIG. 5.

In one configuration, delivery server 110 may include one or more computing systems configured to perform operations consistent with handling content requests from client devices 150 and delivering multimedia content to client devices 150 based on the request. In some embodiments, delivery server 110 may receive requests for content from client devices 150. For example, client devices 150 may request streaming of a movie or a tv show from content delivery system 105 using an HTTP request. Delivery server 110 may provide infrastructure and components to access the requested resource and transmit it to client devices. In such embodiments, delivery server 110 may verify that the user of client devices 150 has adequate credentials and authorize the delivery of content. Further, delivery server 110 may resolve the identity of client devices 150 to provide personalized or customized content and may have recording functions to identify tampered identifications or impersonation attacks.

In some embodiments, delivery server 110 may prepare elements of system 100 for execution of multimedia content delivery. For example, delivery server 110 may provide a master web manifest to client devices—which may be indistinguishable between different client devices 150—that is used to interface client devices 150 with content delivery system 105. In such embodiments, as further described below in connection with FIG. 7, the manifest may include fake segment URLs. That is, the manifest may include URL segments with missing portions or associated with nonexistent locations. Further, client delivery server 110 may store content and advertisement variants that are prepared in advance of requests from client devices 150. The content stored in delivery server 110 may include signaling for advertisement (e.g., the content may specify inline insertion of cue tones in mpeg-ts streams). Moreover, delivery server 110 may store content in local memories, such as caching infrastructures that are provided by CDNs, local proxies, and/or the HTTP caching capability.

In some embodiments, delivery server 110 may implement a CDN server and perform functions such as routing content, resolving domain systems, handling content requests, and creating sessions with client devices for content delivery. For example, as shown in FIG. 1, delivery server 110 may be coupled with origin server 130 and advertising server 120. In such embodiments, delivery server 110 may fetch information from other servers, arrange it for client devices, and deliver it to client devices 150 via network 170. In such embodiments, delivery server 110 may be configured to handle multiple streams in parallel, such as providing different data streams to multiple client devices 150. Further, delivery server 110 may be configured to provide authentication credentials to client devices 150. For example, delivery server 110 may provide a secure cookie, or an equivalent technique for authentication, at a session startup time. Delivery server 110 is further described in connection with FIG. 2.

Advertising server 120 may include one or more computing systems configured to store advertising segments, select targeted advertisements for a user, and prepare and upload advertisements within the principal content. In some embodiments, advertising server 120 may prepare advertising segments and send them to delivery server 110 before client devices 150 transmit a requests. Advertising server 120 may include multiple advertising segments, each one associated with different metadata that is used for selection. For example advertising segments may have metadata that categorize them based on user profiles, including variables such as bitrate and resolution, but also based on potential monetization.

In some embodiments, advertising server 120 may also be configured to receive messages from other elements of system 100. For example, advertising server 120 may be configured to receive requests from origin server 130 to include and/or select advertisements in principal content.

In some embodiments, advertising server 120 may be associated directly with publishers or principal content managers. In such embodiments, advertising server 120 may be configured to manage slots in the principal content to display advertisements that have been sold via direct campaigns. In such embodiments, advertising server 120 may also act as a management platform helping to decide which advertisement codes to serve in their advertisement slots. Alternatively, or additionally, advertising server 120 may be associated directly with an advertiser, which selects advertisements for the customer and track advertisement performance. In such embodiments, advertising server 120 may collect campaign data and verify certain metrics, such as impressions and clicks. Further, advertising server 120 may perform advertising optimizations. For example, advertising server 120 may run a series of A/B tests and modify the selected content based on test results.

Moreover, in some embodiments, advertising server 120 may be configured to perform advertising inventory forecasting. For instance, advertising server 120 may estimate how much inventory and of what type the publisher will have available for sale in the future based on the current campaigns & traffic projections. Advertising server 120 may also store and manage advertisement codes, set up tracking criteria for advertisement campaigns, track the performance (impressions, clicks, conversions, etc.) of the whole campaign across all publishers, measure the reach of a campaign while taking into account the co-viewership across publishers, verify the reports provided by the publishers, and optimize campaigns. Advertising server 120 is further described in connection with FIG. 3.

Origin server 130 may include one or more computing systems that perform operations to store and provide multimedia content. Origin server 130 may include databases that include content assets, such as videos or movies. Origin server 130 may also include processors that perform authentication functions of client devices 150, users of client devices 150, and/or resolve client identities based on client IDs and/or a secure token. In some embodiments, origin server 130 may include processors configured to encode content and packet content in different formats. Further, origin server 130 may include processing devices to resolve URLs and map different segments of advertisement and content. In some embodiments, origin server 130 may include multiple core processors to handle concurrently multiple operations and/or streams. For example, origin server 130 may include parallel processing units to concurrently handle requests of multiple client devices 150.

In some embodiments, origin server 130 may store the original version of multimedia content and send copies with different configurations to delivery server 110. For example, origin server 130 may compress an original video file and send it to delivery server 110, which may then store it in cache. In such embodiments, origin server 130 may allow automatic requests from delivery server 110. However, in other embodiments, origin server 130 may implement firewalls that only allow a limited number of pull requests or only allow periodic pull requests to update content. In yet other embodiments origin server 130 may include a just-in-time packager with no storage.

Moreover, origin server 130 may be configured to automatically handle specific requests from delivery server 110. For example, when delivery server 110 performs a pull request due to a 'cache miss,' origin server 130 may be configured to redirect delivery server 110 to a different memory address. In such embodiments, origin server 130 may include a relational database, or other similar data structures, to correlate the pull request from delivery server 110 with an address that has a copy of multimedia content and/or advertising content. Further, origin server 130 may include dedicated hardware to perform redirecting operations. For example, origin server 130 may include a Simple Risc Computer (SRC) architecture, or other reconfigurable computing system, specifically configured to handle pull requests with 'cache miss.' Origin server 130 is further described in connection with FIG. 4.

FIG. 1 shows delivery server 110, advertising server 120, and origin server 130 as different components of content delivery system 105. However, delivery server 110, advertising server 120, and origin server 130 may be implemented in the same computing system. For example, all elements in content delivery system 105 may be embodied in a single server having different virtualization modules. Alternatively, content delivery system 105 may be embodied in a distributed computing framework with different modules to perform the roles of delivery server 110, advertising server 120, and origin server 130.

Network 170 may be any type of network configured to provide communications between components of system 100. For example, network 170 may be any type of network (including infrastructure) that provides communications, exchanges information, and/or facilitates the exchange of information, such as the Internet, a Local Area Network, near field communication (NFC), optical code scanner, or other suitable connection(s) that enables the sending and receiving of information between the components of system 100. In other embodiments, one or more components of system 100 may communicate directly through a dedicated communication link(s).

It is to be understood that the configuration and boundaries of the functional building blocks of system 100 have been defined herein for the convenience of the description. Alternative boundaries can be defined so long as the specified functions and relationships thereof are appropriately performed. Alternatives (including equivalents, extensions, variations, deviations, etc., of those described herein) will be apparent. Such alternatives fall within the scope and spirit of the disclosed embodiments.

Figure 2:
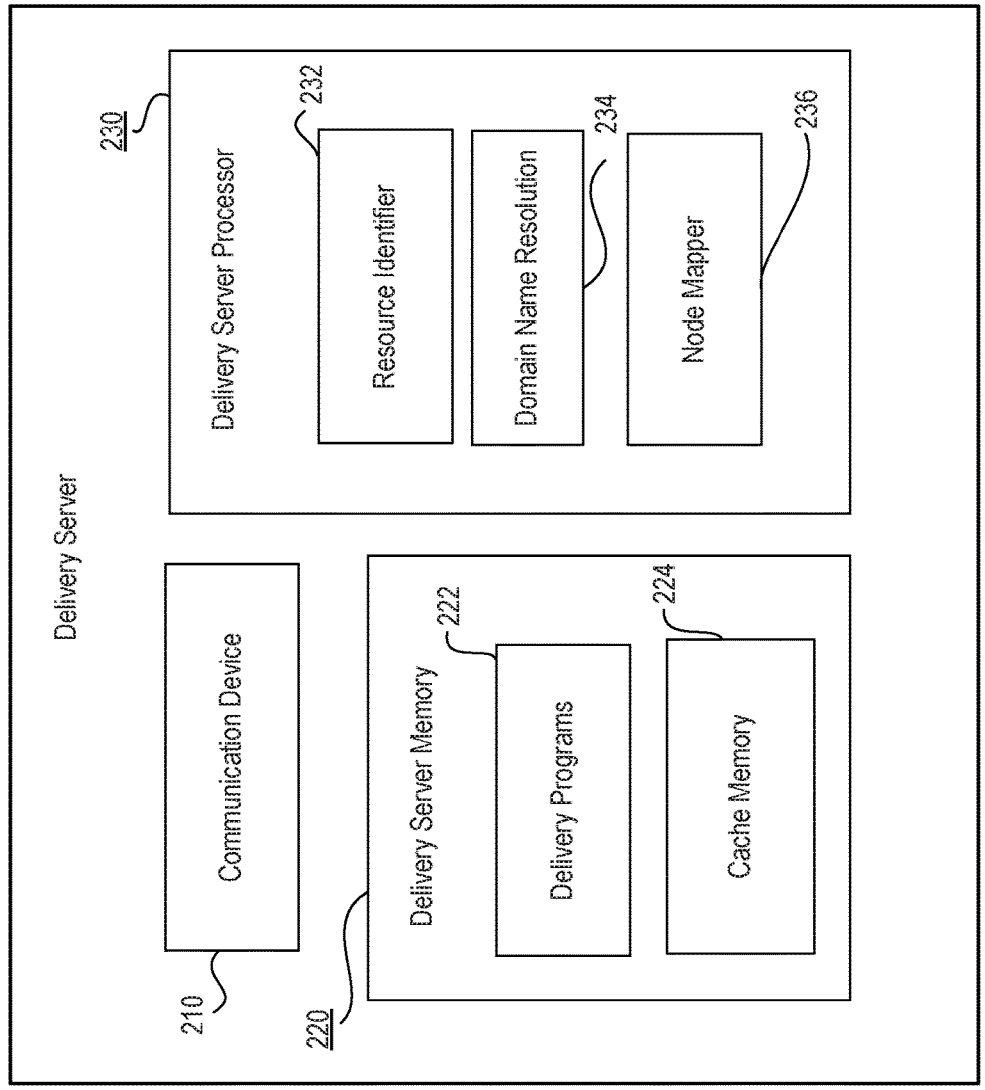
FIG. 2 is a block diagram of an exemplary content delivery server, consistent with disclosed embodiments.

FIG. 2 shows a block diagram of an exemplary delivery server 110 (FIG. 1), consistent with disclosed embodiments. Delivery server 110 may include a communication device 210, a delivery server memory 220, and one or more delivery server processors 230. Delivery server memory 220 may include delivery programs 222 and cache memory 224. Delivery server processors 230 may include a resource identifier 232, a domain name resolution 234, and a node mapper 236.

In some embodiments, delivery server 110 may take the form of a server, a general purpose computer, a mainframe computer, or any combination of these components. In other embodiments, delivery server 110 may be a virtual machine. Other implementations consistent with disclosed embodiments are possible as well.

Communication device 210 may be configured to communicate with one or more databases, such as databases 180 described above, and other elements of system 100 either directly or via network 170. In particular, communication device 210 may be configured to receive multimedia content from origin server 130. Further communication device 210 may be configured to receive user account information from databases 180 to determine advertising and content selection. In addition, communication device 210 may be configured to communicate with other components as well, including, for example, advertising server 120 and client devices 150. For example, advertising server 120 may provide advertisement variants for different bit rate and resolutions to delivery server 110 via communication device 210, or delivery server 110 may transmit content to client devices 150 using HLS or other streaming methods controlled by communication device 210.

Communication device 210 may include, for example, one or more digital and/or analog devices that allow communication device 210 to communicate with and/or detect other components, such as a network controller and/or wireless adaptor for communicating over the Internet. Other implementations consistent with disclosed embodiments are possible as well.

Delivery server memory 220 may include one or more storage devices configured to store instructions used by delivery server processors 230 to perform functions related to disclosed embodiments. For example, delivery server memory 220 may store software instructions, such as delivery programs 222, that may perform operations when executed by delivery server processors 230. The disclosed embodiments are not limited to separate programs or computers configured to perform dedicated tasks. For example, delivery server memory 220 may include a single delivery program 222 that performs the functions of delivery server 110, or delivery programs 222 may comprise multiple programs. Delivery server memory 220 may also store cache memory 224 that is used to store principal and advertising content and/or for delivery programs 222. For example, cache memory 224 may include copies of principal content that have already been modified to include advertising segments. With the principal and advertising content stored in cache memory 224, delivery server 110 may quickly respond to user content requests. For example, when performing a pull request from origin server 130, origin server 130 may respond with redirection instructions to a different memory address in cache memory 224. In this way, extra calls from the delivery server 110 to origin server 130 when there is a 'cache miss' add low overhead because they are only used for redirection. In such embodiments, locally storing content enables handling transactions without additional traffic of content segments and reduce latency.

In certain embodiments, delivery server memory 220 may store sets of instructions for carrying out processes to update content stored in cache memory 224, perform user authentication tasks, and/or interact with databases 180 to determine the status of user accounts. In certain embodiments, delivery server memory 220 may store sets of instructions for requesting content from online resources 140 that have user or content files. Other instructions are possible as well.

In general, instructions may be executed by delivery server processors 230 to perform processes consistent with disclosed embodiments.

In some embodiments, delivery server processors 230 may include one or more known processing devices, such as, but not limited to, microprocessors from the Pentium™ or Xeon™ family manufactured by Intel™, the Turion™ family manufactured by AMD™, or any of various processors from other manufacturers. However, in other embodiments, delivery server processors 230 may be a plurality of devices coupled and configured to perform functions consistent with the disclosure. For example, delivery server processors 230 may include a plurality of co-processors, each configured to run specific delivery server 110 operations such as floating point arithmetic, graphics, signal processing, string processing, cryptography or I/O interfacing.

In some embodiments, delivery server processors 230 may execute software to perform functions associated with each component of delivery server processors 230. In other embodiments, each component of delivery server processors 230 may be an independent device. In such embodiments, each component may be a hardware device configured to specifically process data or perform operations of processing transactions. For example, resource identifier 232 may be a field-programmable gate array (FPGA), while node mapper 236 may be a central processing unit (CPU). Other hardware combinations are also possible. In yet other embodiments, combinations of hardware and software may be used to implement delivery server processors 230.

Resource identifier 232 may process URLs in client requests to identify requested content. Further resource identifier 232 may identify encoded information in URLs. For example, resource identifier 232 may identify a client ID encoded in the URL or a client ID appended to the request. The client ID may be embodied in any tool for the identification of client devices 150 and/or user accounts. For example, client ID may identify the client using a secure token and/or cookie, or an equivalent technique for authentication.

In some embodiments, resource identifier 232 may perform address resolution for multiple syntaxes in the URL. For example, resource identifier 232 may be configured to enable short user transactions in which the fill URL is transformed into a relative pathname. For instance, "cache=/usr/local/oz/cache" can allow resource identifier 232 to permit local caching of stored content. Alternatively, or additionally, resource identifier 232 may employ a prefix method in which "prefix=http://www.mozart-oz.org/home/=~/oz/" has the form prefix=LOC1=LOC2. In such embodiments, whenever the input URL begins with the string LOC1, this prefix is replaced by LOC2 and resource identifier 232 may fetch the content. Furthermore, resource identifier 232 may employ a patter resolution of URL in which "pattern=http://www.?{x}/home/?{y}=ftp://ftp.?{x}/oz/?{y}" is resolved by matching variables such as {x} and {y} that should match arbitrary sequences of characters. In some embodiments, resource identifier 232 may use a default handler that simply looks up the input URL itself, when all previous methods have yielded nonexistent URLs. Moreover, in some embodiments resource identified 232 may be configured to quickly identify fake segment URLs. For example, resource identifier 232 may be configured to first check the validity of the URL before performing any resolution steps.

In some embodiments, delivery server processors 230 may include a domain name resolution 234 to route data and identify requested content. For example, in some embodiments client devices 150 may request content using a domain name instead of an URL. In such embodiments, domain name resolution 234 may identify an address based on the domain name. For instance, domain name resolution 234 may perform a DNS name query resolution for the specified name using functions such as "Resolve-Dns-Name." In some embodiments, the DNS query may be limited to use the cache memory 224 only by for example, including optional parameters such as "CacheOnly." In other embodiments, domain name resolution 234 may resolve names using techniques like C-Ares to resolve domain names using functions such as:

```
dns.resolve4('www.name.com', function (err, addresses) {
    if (err) throw err;
    console.log('addresses:' + JSON.stringify(addresses));
    addresses.forEach(function (a) {
        dns.reverse(a, function (err, domains) {
            if (err) {
                console.log('reverse for' + a + 'failed:' +
                    err.message);
            } else {
                console.log('reverse for' + a + ':' +
                    JSON.stringify(domains));
```

Node mapper 236 may include processors that identify nodes and different origin servers in a CDN to request multimedia files or route client requests. For example, communication device 210 may receive a request from client devices 150. If the content is not available in the delivery server memory 220, delivery server 110 may request the appropriate content from an identified server. In such embodiments, node mapper 236 may perform operations to associate the request with a target origin. For example, node mapper 236 may invoke an application programming interface (API) to list all of the existing origins within an endpoint. Based on this information, node mapper may identify a server that has the requested content and perform a pull request from the server. Node mapper 236 may also include multiple APIs for different content servers. For example, node mapper 236 may store APIs for different security settings. In such embodiments, once node mapper 236 identifies a server from the list by endpoint, node mapper 236 may invoke specified APIs to interact with the identified server. Further, node mapper 236 may call tables storing information of servers in a CDN. In such embodiments, node mapper 236 can serve the files for the components and dependencies concatenated and as a minified file, or as individual files through use of a download builder to generate CSS or JS files. For example, node mapper 236 may call a "DataTable" by calling "https://address/1.10.19/css/jquery.dataTables.min.css" and/or "https://address/1.10.19/js/jquery.dataTables.min.js." Accordingly, node mapper 236 may allow delivery server processors 230 to pinpoint servers with target content and perform the requests based on URLs received from client devices 150.

The components of delivery server 110 may be implemented in hardware, software, or a combination of both. For example, although one or more components of delivery server 110 may be implemented as computer processing instructions embodied in computer software, all or a portion of the functionality of delivery server 110 may be implemented in dedicated hardware. For instance, groups of GPUs and/or FPGAs maybe used to quickly process multimedia content in delivery server processors 230.

Figure 3:
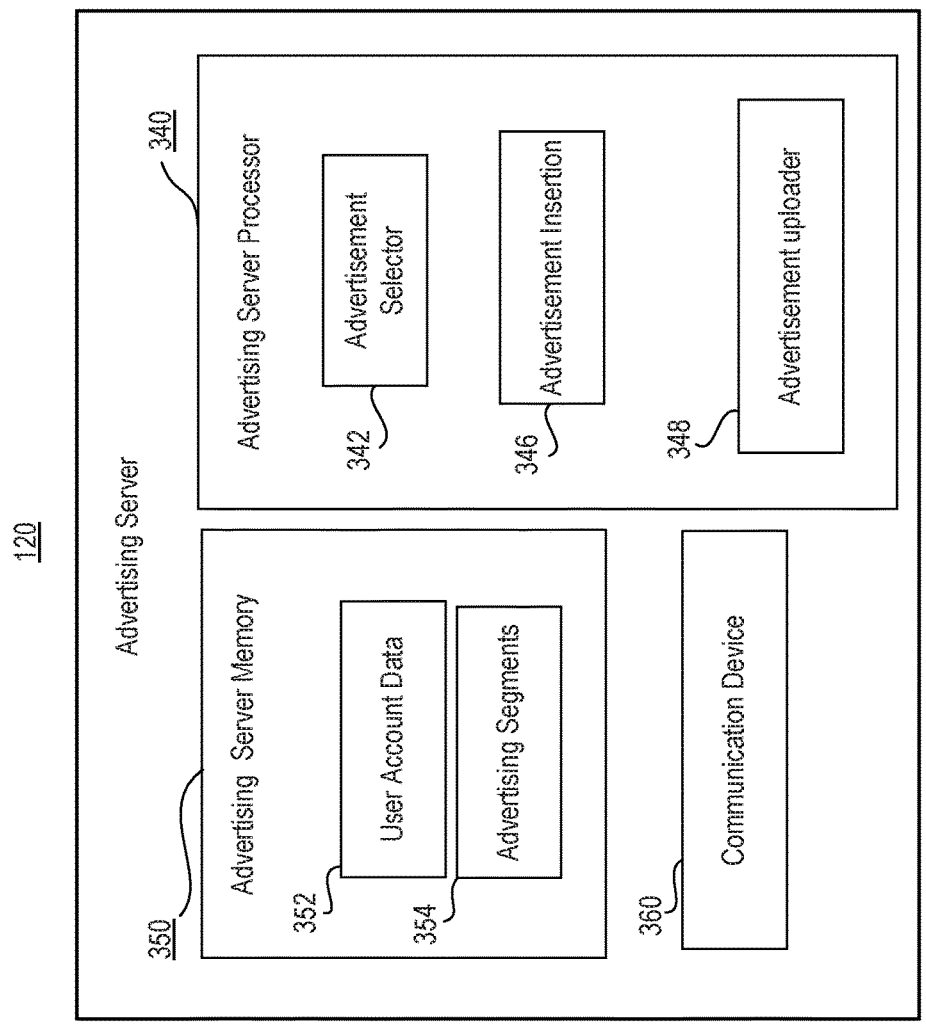
FIG. 3 is a block diagram of an exemplary advertising server, consistent with disclosed embodiments.

Referring now to FIG. 3, there is shown a block diagram of an exemplary advertising server 120 (FIG. 1), consistent with disclosed embodiments. Advertising server 120 may include an advertising server processor 340, an advertising server memory 350, and a communication device 360. In some embodiments, advertising server 120 may handle request for advertisements from other elements of system 100. For example, advertising server 120 may provide advertisement content to delivery server 110 or to origin server 130.

Advertising server processor 340 may be embodied as a processor similar to delivery server processors 230. Advertising server processor 340 may include an advertisement selector 342, and advertisement insertion module 346, and an advertisement uploader 348.

Advertisement selector 342 may gather relevant information from a request to identify advertisements that are tailored for a user. For example, advertisement selector 342 may collect a client identification and a segment identification to select advertisement segments that should be displayed to the user. In some embodiments, advertisement selector 342 may generate a multiple advertisement segments and yield groups that match a subset of the targeting criteria based on the request. For example, if the request for multimedia content comes from a man in Europe using Windows, advertisement selector 342 may retrieve a group of advertisements for targeting men, men in Europe, and/or men in Europe using Windows OS. Advertisement selector 342 may, however, discard advertisement groups targeting men in America using Windows or women in Europe. In such embodiments, advertisement selector 342 may select the level of specificity based on the available advertisement inventory.

Advertisement selector 342 may generate a list of matching groups, and proceed to remove items that may not be eligible. For example, advertisement selector 342 may remove items due to frequency capping, day parting, and/or creator exclusions. Advertisement selector 342 may also correlate previous engagement values to identify other advertisements that have already been chosen to serve in a page view because advertisements previously chosen to serve on the page prevent eligibility of similar items. Further, advertisement selector 342 may employ roadblocking and other exclusion policies during advertisement segment selection.

Once advertisement selector 342 curates the list of eligible items, advertisement selector 342 may iterate through each priority level, from highest priority to lowest priority, looking for eligible items. If advertisement selector 342 finds items eligible to compete, advertisement selector 342 may dynamically allocate ranks and choose the highest value item. In some embodiments, the selection may also be based on a temporary cost per thousand (CPM) calculated for some items and engagement factors such as click through rate (CTR). Further, in some embodiments, advertiser selector 342 may perform auctions with other elements of system 100, such as online resources 140, to identify highest priorities during advertisement selection.

Advertisement insertion module 346 may include processors and systems for including or stitching advertisements in multimedia content. Advertisement insertion module 346 may include a cue tone detector that identifies locations where advertising content is to be inserted, a controller that plans what advertisements are to be run, a video cutover that pauses and transfer principal content to insert ads, and an advertisement tracker that records which advertisements are inserted, for reporting and billing purposes.

In some embodiments, advertisement insertion module 346 modifies principal content received from origin server 130 to include selected ads. For example, origin server 130 may provide a movie file as principal content. The movie file may include locations in which advertisements may be inserted or cue tones. Advertisement insertion module 346 may identify the cue tones and insert advertisements selected by advertisement selector 342. The principal content is thus converted into principal plus advertisement content upon passing through advertisement insertion module 346.

Advertisement uploader 348 may prepare content segments for uploading in delivery server 110. For example, advertisement uploader 348 may convert segments to a format that is required by delivery server 110. In such embodiments, advertisement uploader 348 may apply video containers to bundle all elements of a video into one package. For example, advertisement uploader 348 may bundle video and audio streams, subtitles, video metadata, using a codec selected based on the operating system of delivery server 110. In such embodiments, advertisement uploader 348 can employ video containers such as MP4, AVI, MOV, FLV, and/or WMV. Additionally, or alternatively, advertisement uploader 348 may compress the principal content and advertising segments in preparation to upload it using a codec. For example, advertisement uploader 348 may employ video codecs such as H.264, MPEG-4, DivX, MPEG-2, and HEVC (H.265).

Moreover, in some embodiments advertisement uploader 348 may encode content in multiple formats to generate different advertisement variants for delivery server 110. For example, advertisement uploader 348 can generate advertisement variants that encode different bitrate and/or ABR resolutions. Also, advertisement uploader 348 may encode advertisement variants based on different type of media players and variants of operating systems. Further, in some embodiments, advertisement uploader 348 may perform JavaScript-based HTML5 video player functions to embed advertisements in URLs, to prevent advertisement discrimination based on the associated address. For example, advertisement uploader 348 may embed principal and advertisement content within URLs.

Furthermore, advertisement uploader 348 may perform editing operations to the multimedia content in order to prepare them for delivery server 110. For example, advertisement uploader 348 may resize and crop videos in order to match the graphic design of layouts determined by delivery server 110. Further, advertisement uploader 348 may crop and manipulate videos, generate dynamic URLs, or use code to either add video tags or build the URLs.

Advertising server memory 350 may include one or more storage devices configured to store instructions used by Advertising server processor 340 to perform operations related to disclosed embodiments. For example, advertising server memory 350 may store software instructions that may perform operations when executed by Advertising server processor 340. In addition advertising server memory 350 may include user account data 352, which may include information about user privileges and/or preferences for advertisement display. User account data 352 may also store DRM licenses for different users and log license utilization by different users. In addition, user account data 352 may include data structures that associate client IDs, such as the ones being transmitted from HTTP requests, with user accounts.

Advertiser server memory 350 may also store advertising segments 354. Advertising segments 354 may store multiple advertisement segments with a plurality of configurations that could be used by advertisement insertion module 346. For example, advertising segments 354 may include a plurality of advertisements for different bit rates, resolutions, different geographies, and different target users.

In certain embodiments, advertising server memory 350 may store sets of instructions for carrying out processes to determine whether advertisements should be presented for a device ID. For example, content delivery system 105 may receive a request for content from client devices specifying a segment and a device identification. Based on this information, advertising server 120 may determine if the user associated with the device ID should be presented advertisements, or if the user is exempt of advertisements.

Figure 4:
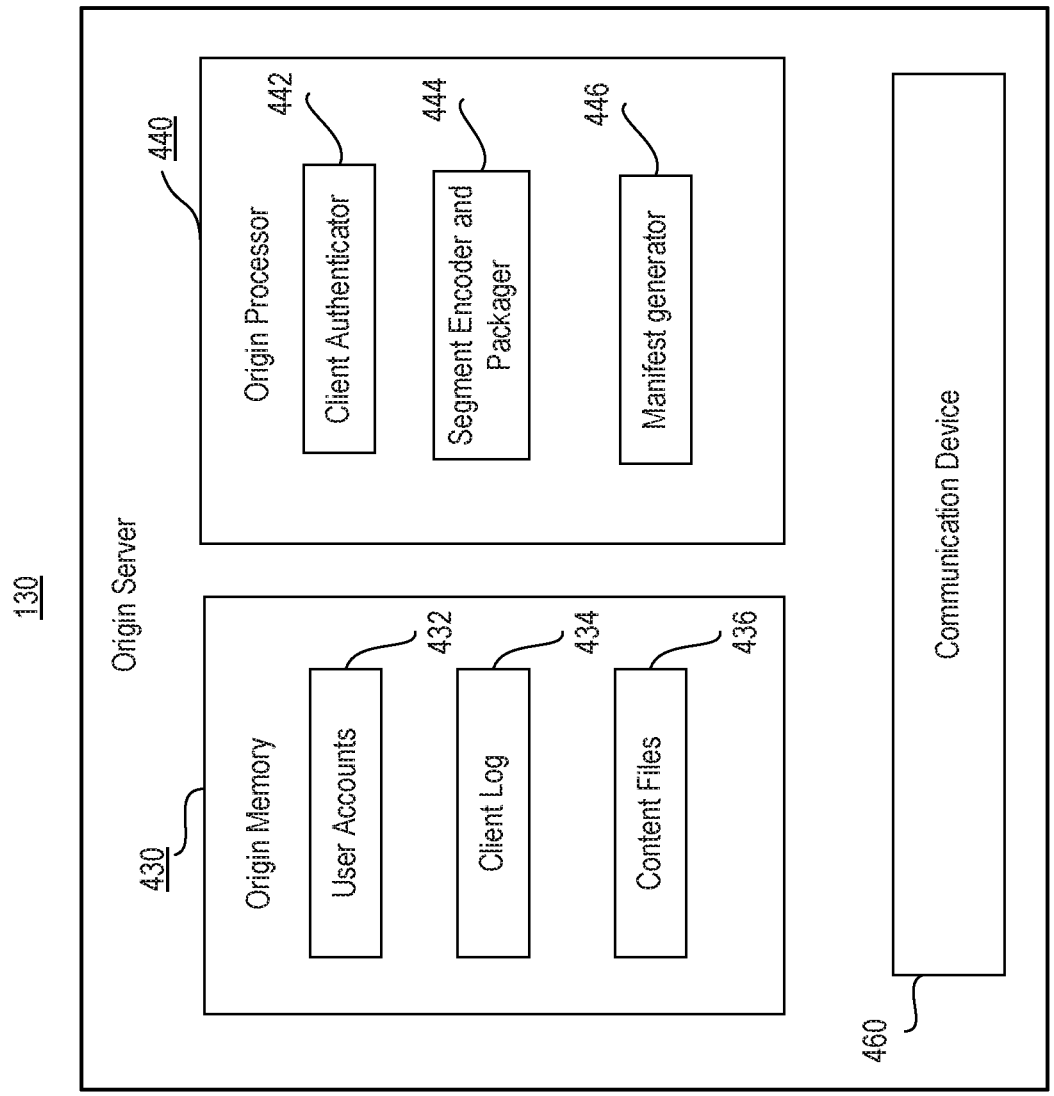
FIG. 4 is a block diagram of an exemplary origin server, consistent with disclosed embodiments.

Referring now to FIG. 4, there is shown a block diagram of an exemplary origin server 130 (FIG. 1), consistent with disclosed embodiments. Origin server 130 may include an origin memory 430, an origin processor 440, and a communication device 460. In some embodiments, origin server 130 may be configured to store and provide copies of primary content, resolve client identification, and redirect delivery server 110 when it finds an invalid URL.

Origin memory 430 may include one or more storage devices configured to store instructions for handling content requests from delivery server 110 and/or client devices 150. Origin memory 430 may include client logs 434, which may record interactions between client devices 150 and content delivery system 105. In addition, client logs 434 may track IDs and digital rights management (DRM) licenses to protect against users sharing IDs or using other client IDs. With this information, origin server 130 may identify suspicious colluders that tamper with client IDs. Origin memory 430 may include user accounts 432, which may include information about user accounts. For example, user accounts 432 may include databases including user preferences that may determine whether or not the user has privileges to skip ads. Additionally, or alternatively, user accounts 432 may include user account information, such as available balance or credit, or user-generated account locks. Moreover, user accounts 434 may include authentication information and a user profile, including, for example, location of the user, estimated income, search history, and other datasets that can be used by advertising server 120 for advertisement selection.

Origin memory 430 may also include content files 436 storing principal content information. For example, content files 436 may include multimedia content files (MCF) with movies, videos, and/or other content that may be streamed to client devices. Content files 436 may be implemented with data structures with different privilege levels to control these assets. For example, content files 436 may only allow access to file in an MCF directory when an application has appropriate file privileges specified in the application's crystallographic Information file (CIF) in the Applet primitive.

Origin memory 430 may also include storage devices storing instructions used by origin processor 440 to perform functions related to disclosed embodiments. For example, origin memory 430 may store software instructions that may perform one or more operations when executed by origin processor 440. In addition, origin memory 430 may store user records of account history and normal patterns to identify potential fraud.

Origin processor 440 may be embodied as a processor similar to delivery server processors 230. Origin processor 440 processor may include client authenticator 442, a segment encoder and packager 444, and a manifest generator 446.

Client authenticator 442 may be implemented with hardware or software configured to compare credentials received from client devices 150, such as passwords or biometric data received from the client devices 150, with information associated with the particular user account. Alternatively, or additionally, client authenticator 442 may resolve a client ID appended to an HTTP request to identify a user account. For example, client authenticator 442 may be configured to identify a secure cookie, or an equivalent technique for authentication, and determine whether the request is from a user that has access rights. In such embodiments, client authenticator 442 may perform encryption and decryption processes to provide and verify the identification tool. In some embodiments, client authenticator 442 may provide private and public keys to delivery server 110 so delivery server 110 can provide client devices 150 identification information at the startup time of a session. In such embodiments, requests for content generated by client devices 150 may include a client ID associated with the authentication information. Additionally, or alternatively, client authenticator may use device-level information to authenticate a client request. For example, a user account may be associated with a client device 150 associated with a specific MAC address. Then, client authenticator 442 may compare MAC address templates to identify client devices 150 or resolve inconsistent IDs. In other embodiments, client authenticator 442 may include a feature extraction which generates a normalized data file from client requests to more efficiently determine if the user can be authenticated.

Segment encoder and packager 444 may perform operations to modify principal content so it can be stored in delivery server 110 and delivered to client devices 150 when it is requested. For example, segment encoder and packager 444 may generate video files for delivery that include video and audio streams, subtitles, video metadata, using a codec selected based on the operating system of delivery server 110. In such embodiments, segment encoder and packager 444 can perform operations to generate data files such as MP4, AVI, MOV, FLV, and/or WMV. Additionally, or alternatively, segment encoder and packager 444 may manipulate the content files so they can be easily exchanged between different elements of system 100. For example, advertisement uploader 348 may compress video files using formats such as H.264, MPEG-4, DivX, MPEG-2, and HEVC (H.265). In some embodiments, segment encoder and packager 444 may encode data files with different standards based on models and characteristic of principal content. For example, segment encoder and packager 444 may encode portions of high-speed action with one standard while encoding slow scenes with a different format. Moreover, segment encoder and packager 444 may interpret metadata associated with content received from content files 436 and generate data files based on models and descriptions in metadata to encode or package different portions.

Manifest generator 446 may perform operations to generate a web manifest that can be distributed to client devices 150. Web manifest refer to files containing metadata for a group of accompanying files that are part of a set or coherent unit. For example, the files of a computer program may have a manifest describing the name, version number, license and the constituting files of the program. For multimedia content distributions, web manifests provides information about an application (such as its name, author, icon, description, and expected URL calls) in a JSON text file. The manifest informs details for websites installed on the home of a device, providing users with quicker access. Moreover, the web manifest may control the behavior of a media player.

For example, the web manifest may specify the duration of each one of the segments and signal cues for interruptions and displaying ads. The web manifest may also specify URLs from where to fetch data to be displayed.

In some embodiments, manifest generator 446 may produce the JSON files based on the content available in, for example, content files 436. Moreover, manifest generator 446 may setup instructions so browsers automatically display an install icons or media players. Further, manifest generator 446 may specify URL parameters to detect when application are being launched to initiate sessions. In addition, manifest generator 446 may determine display-mode CSS media query, set size of display, and orientation. Manifest generator 446 may also include addressing processes for fetching content from content delivery system 105. For example, manifest generator 446 may specify a "start_url" and scope to that directory and include default routings when there is an unavailable URL.

In some embodiments, manifest generator 446 may generate a master web manifest that may be delivered to each one of client devices 150. The master web manifest may include fake URLs as sources of content to trigger a redirection when the user seeks content. For example, manifest generator 446 may include a URL with a fake address and a nonexistent site such as:

```
"related_applications": [{
    "platform": "play",
    "url": "https://fakeAddress/store/apps/details?id=nonexitent.com"
```

Manifest generator 446 may also execute instructions to generate a manifests that are indistinguishable to users and that do not discriminate between advertising and principal content. For example, instead of generating a unique manifest per client device, manifest generator 446 may use the same manifest for all client devices 150. In addition, manifest generator 446 may only include calls to addresses that bundle advertising and primary content. For example, manifest generator 446 may produce manifest with unique URLs, which may be fake to trigger a redirection. While including fake segment URLs, in some embodiments, manifest generator 446 may generate legitimate manifests that do not include proprietary tags and are configured to be executed by standard browsers and CDNs.

Communication device 460 may be embodied as one or more digital and/or analog devices to enable communication between origin server 130 and other elements of content delivery system 105, and between origin server 130 and other elements of system 100, such as client devices 150.

Figure 5:
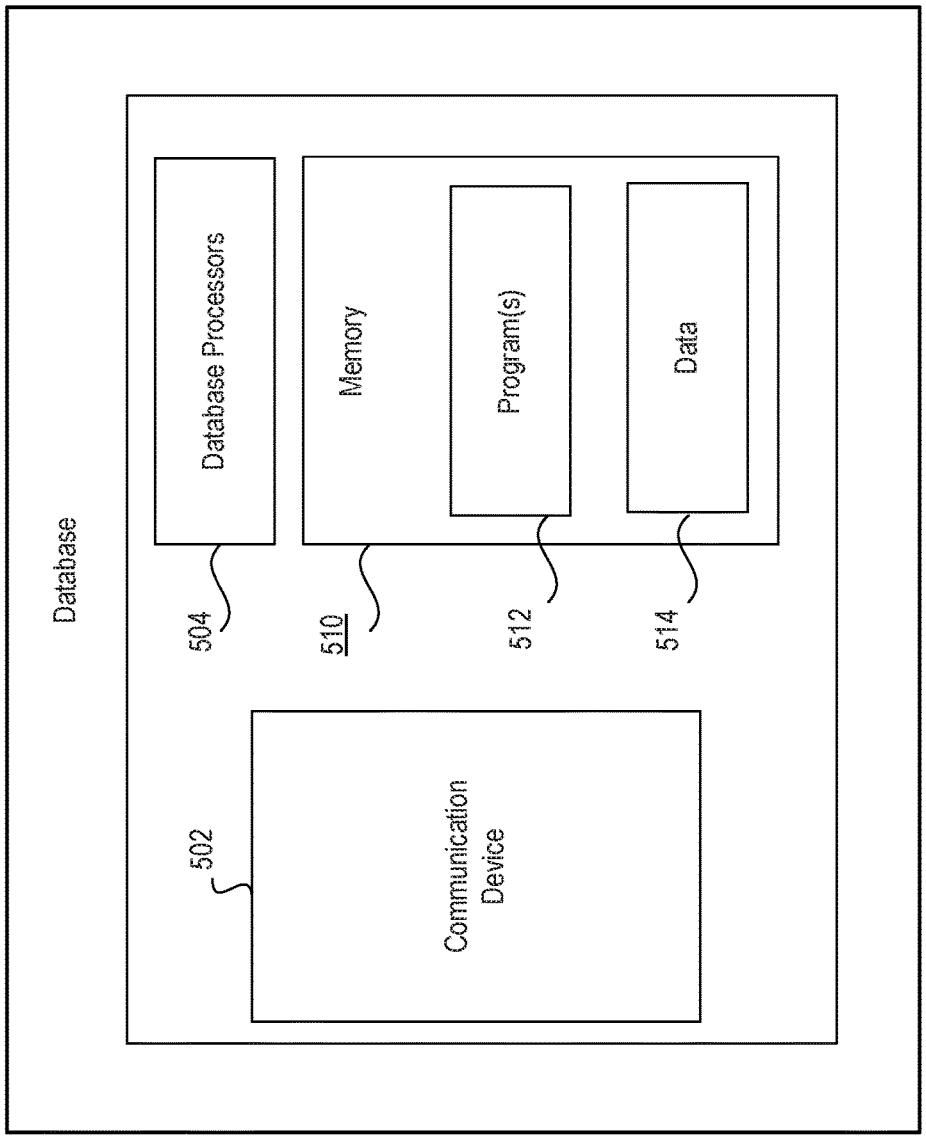
FIG. 5 is a block diagram of an exemplary database, consistent with disclosed embodiments.

Referring now to FIG. 5, there is shown a block diagram of an exemplary database 180 (FIG. 1), consistent with disclosed embodiments. Database 180 may include a communication device 502, one or more database processors 504, and database memory 510 including one or more database programs 512 and data 514. In some embodiments, database 180 may implement a Multimedia database (MMDB).

In some embodiments, databases 180 may take the form of servers, general purpose computers, mainframe computers, or any combination of these components. In some embodiments, databases 180 are included within other elements of system 100, such as content delivery system 105. Other implementations consistent with disclosed embodiments are possible as well.

Communication device 502 may be configured to communicate with one or more components of system 100, such as online resources 140, content delivery system 105, advertising server 120, origin server 130, and/or client devices 150. In particular, communication device 502 may be configured to provide to advertising server 120, delivery server 110, and origin server 130 user account information, user preferences and privileges, and/or multimedia segments (both for primary and advertising content).

Communication device 502 may be configured to communicate with other components as well, including, for example, advertising server memory 350 (FIG. 3), origin memory 430 (FIG. 4), and delivery server memory 220 (FIG. 2). Communication device 502 may take any of the forms described above for communication device 210 (FIG. 2).

Database processors 504, database memory 510, database programs 512, and data 514 may take any of the forms described above for delivery server processors 230, memory 220, delivery programs 222, and cache memory 224, respectively, in connection with FIG. 2. The components of databases 180 may be implemented in hardware, software, or a combination of both hardware and software. For example, although one or more components of databases 180 may be implemented as computer processing instruction modules, all or a portion of the functionality of databases 180 may be implemented instead in dedicated electronics hardware. For example, database processors 504 may operate a Multimedia Database Management System (MMDBMS). In such embodiments, database processors 504 may manage different types of data potentially represented in a wide diversity of formats on a wide array of media sources. For example, database processor 504 may support multimedia data types, and facilitate for creation, storage, access, query and control of a multimedia database. In such embodiments, database processors 504 may uniformly query data (media data, textual data) represented in different formats and simultaneously query different media sources and conduct database operations across them. Further, database processors 504 may retrieve media objects from a local storage device in a good manner and respond to queries for audio-visual media and have the ability to deliver this presentation.

Data 514 may be data associated with websites, such as online resources 140, or user accounts from client devices 150. Data 514 may include, for example, information relating to users and their credentials to obtain content. Data 514 may also include content files, similar to content files 436 (FIG. 4), including primary media data types such as text, images, graphic objects (including drawings, sketches and illustrations) animation sequences, audio and video.

Figure 6:
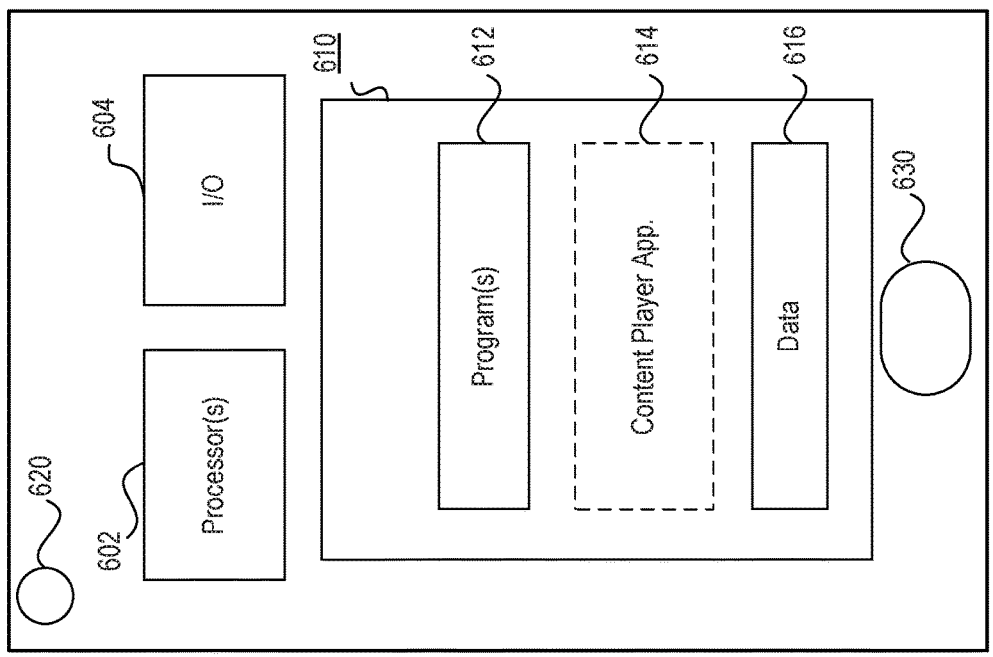
FIG. 6 is a block diagram of an exemplary client device, consistent with disclosed embodiments.

Referring now to FIG. 6, there is shown a block diagram of an exemplary client device 150 (FIG. 1), consistent with disclosed embodiments. In one embodiment, client devices 150 may include one or more processors 602, one or more input/output (I/O) devices 604, and one or more memories 610. In some embodiments, client devices 150 may take the form of mobile computing devices such as smartphones or tablets, general purpose computers, or any combination of these components. Alternatively, client devices 150 (or systems including client devices 150) may be configured as a particular apparatus, embedded system, dedicated circuit, and the like based on the storage, execution, and/or implementation of the software instructions that perform one or more operations consistent with the disclosed embodiments. According to some embodiments, client devices 150 may comprise web browsers or similar computing devices that access web site consistent with disclosed embodiments.

Processor 602 may include one or more known processing devices, such as mobile device microprocessors manufactured by Intel™, NVIDIA™, or various processors from other manufacturers. The disclosed embodiments are not limited to any specific type of processor configured in client devices 150.

Memory 610 may include one or more storage devices configured to store instructions used by processor 602 to perform functions related to disclosed embodiments. For example, memory 610 may be configured with one or more software instructions, such as programs 612 that may perform operations when executed by processor 602. The disclosed embodiments are not limited to separate programs or computers configured to perform dedicated tasks. For example, memory 610 may include a single program 612 that performs the functions of the client devices 150, or program 612 may comprise multiple programs. Memory 610 may also store data 616 that is used for processing and/or displaying multimedia content. That is, memory 610 may include instructions to play multimedia in the client devices, generate content requests, and/or communicate with content delivery system 105.

In certain embodiments, memory 610 may store instructions for displaying multimedia content in client devices 150. For example, memory 610 may include a content player application 614. Moreover, in some embodiments if content player application 614 is not part of memory 610, client devices 150 may include programs 612 to download the applications required to view content and/or execute alternative media players to display the content. In addition, programs 612 may include client identification tools, such as secure cookies, to identify client devices 150 and generate HTTP requests that append the information. Further content player application 614 may be configured to perform automated operations, such as transmitting a decline message when a user does not provide a client ID.

Moreover, other software components may be configured to request information from content delivery system 105 or determine the location of client devices 150. For instance, these software instructions, when executed by processor(s) 602 may process information to display the status of a transaction.

I/O devices 604 may include one or more devices configured to allow data to be received and/or transmitted by client devices 150 and to allow client devices 150 to communicate with other machines and devices, such as other components of system 100. For example, I/O devices 604 may include a screen for displaying optical payment methods such as Quick Response Codes (QR), or providing information to the user. I/O devices 604 may also include components for NFC communication. I/O devices 604 may also include one or more digital and/or analog devices that allow a user to interact with client devices 150 such as a touch-sensitive area, buttons, or microphones. I/O devices 604 may also include one or more accelerometers to detect the orientation and inertia of client devices 150. I/O devices 604 may also include other components known in the art for interacting with content delivery system 105.

In some embodiments, client devices 150 may also include a camera 620 that capture images and may be used for biometric authentication processes, such as facial recognition. Additionally, or alternatively, client devices 150 may include a fingerprint sensor 630 that allows users to unlock client devices 150 and/or perform authentications. Both camera 620 and fingerprint sensor 630 may be operated by processor 602 and use encryption security to make it impossible for users to externally access fingerprint or camera information.

The components of client devices 150 may be implemented in hardware, software, or a combination of both hardware and software, as will be apparent to those skilled in the art.

Figure 7:
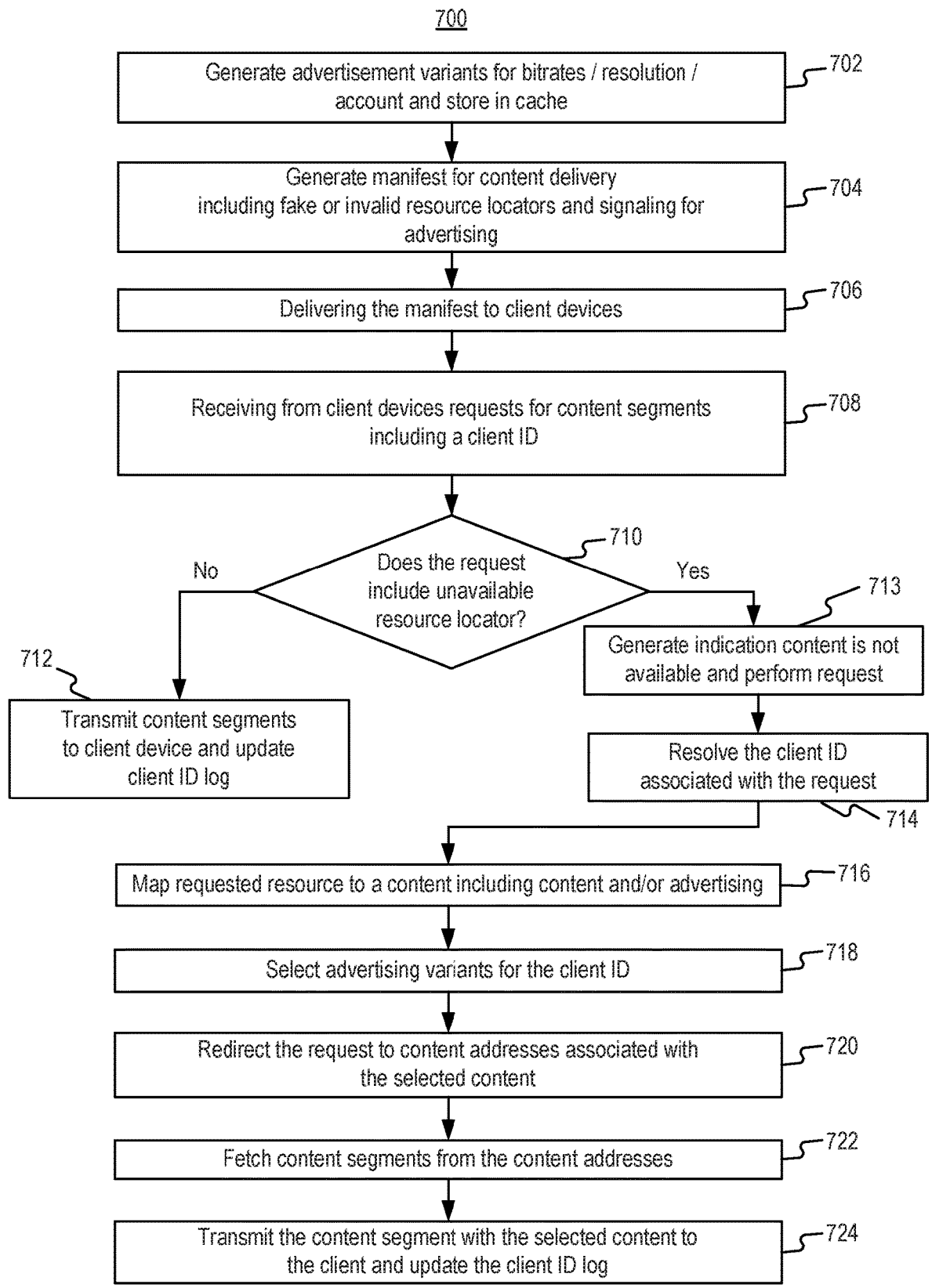
FIG. 7 is an exemplary flow chart illustrating a content delivery process, consistent with disclosed embodiments.

Referring now to FIG. 7, there is shown a flow chart of an exemplary content delivery process 700, consistent with disclosed embodiments. In some embodiments, delivery process 700 may be executed by content delivery system 105 (FIG. 1). For example, delivery process 700 may be performed by delivery server 110.

In step 702, content delivery system 105 may generate advertisement variants and store them in a memory device. For example, content delivery system 105 may generate advertisement variants for different bitrates, resolutions, and streaming accounts, and store them in a memory in delivery server 110, such as cache memory 224. In other embodiments, however, advertisement variants may be stored in other components of system 100 (e.g., databases 180) and may be accessed or retrieved by delivery system 105 for later redirection. In some embodiments, the advertisement variants may already be embedded within principal content with methods described in connection to FIG. 3. Moreover, in step 702 content delivery system 105 may categorize advertisement variants and label them, for example with metadata, so they can be associated with client IDs and segment IDs upon a user request. Further, in some embodiments content delivery system 105 may generate multiple advertisements segments based on a client category (i.e., a client profile, client advertising preferences, or client privileges for no advertising). For example, advertising server 120 may generate and a plurality of advertising segments, being associated with a client category, a bitrate, and a resolution;

In step 704, content delivery system 105 may generate a manifest for content delivery. For example, using manifest generator 446, content delivery system 105 may generate a manifest that describes the application, include a play list type, cue discontinuities for advertisement insertion, and provides URLs for retrieving content. In some embodiments, the manifest of step 704 may include fake URLs. These fake URLs may have missing portions or point to nonexistent locations, and the fake URLs may be included in the manifest to trigger redirections that allow content delivery system 105 to provide personalized content. Further, the manifest may include signaling for advertisement. For example, the manifest may employ SCTE-35 (ANSI/SCTE 35 2013) standard to describe inline insertion of cue tones in mpeg-ts streams. Further, the manifest may include an HTTP Live Streaming (HLS) manifest comprising a plurality of URLs and a Plurality of discontinuity tags. In some embodiments, the manifest may include a master web manifest providing information about an application (such as its name, author, icon, and description) in a JSON text file. In such embodiments, the manifest may inform details for websites installed on a device. In other embodiments, like the ones employed for MPEG-DASH content delivery, the manifest may include the fake URLs in the media. Additional elements of that may be included in the manifest are described in connection with FIG. 11.

In step 706, content delivery system 105 may deliver the manifest to client devices 150. For example, delivery server 110 may communicate the same master manifest to client devices 150. Because each one of client devices 150 receive the same manifest, advertisement blockers are unable to identify advertising cues and/or addresses associated with advertising server 120. Alternatively, or additionally, web manifests distributed to different client devices 150 maybe have different parameters but be indistinguishable for client devices 150. For example, web manifests distributed in step 706 may have encoded parameters that cannot be distinguished by client devices but that can be decoded by content delivery system 105. By providing the same manifest to client devices 150, client devices 150 cannot guess by tracking personalized URLs or manifests whether advertisements are present in the content delivered by content delivery system 105. In addition, web manifests may include instructions to append client IDs to any content request from client devices 150. For example, the web manifests distributed in step 706 may require the inclusion of a client ID at the middle of any HTTP request. Alternatively, or additionally, the web manifest distributed in step 706 may include the client ID at the end of HTTP requests or at the beginning of the HTTP requests.

Further, in some embodiments, the manifest of step 706 may specify an application shell (in HTML, CSS, and/or JavaScript) required for a user interface or a media player. For example, content delivery system 105 may place an application shell's resources and assets in the browser's cache using the manifest.

Steps 702-706 may prepare content delivery system 105 for content requests from client devices 150, which may be received in subsequent steps. For instance, in step 708 content delivery system 105 may receive, from one or more client devices 150, requests for multimedia content. In some embodiments, client devices 150 requests may be generated based on the manifest distributed in step 706. According to the web manifest, the requests may include URLs that describe a requested segment (i.e., segment ID of the requested asset) and appended client identification information (i.e., a client ID identifying the device and/or user). In some embodiments, the client request may also include a CDN address (identifying delivery server 110), a target asset (e.g., video that the client wants to download), and a bitrate (based on the client device connection). For example, the request from client devices may add a string to a HTTPs request identifying an URL that follows the format "https:\\cdnaddress\asset\bitrate\segmentID&ClientID." The client ID may be derived from at least one of a location identifier or a viewing session identifier. Further, in some embodiments, the client request may also include a CDN address, an asset identification, and a bitrate identification; and the selected content comprises both video segments and advertising segments.

However, other methods to pass a client ID from client devices 150 to the delivery server 110, such as communication through alternative channels or encrypted information, are also possible. Further, the client request may include a plurality of URLs directed to different segments and buffering conditions. In some embodiments, the manifest may include instructions to have client devices 150 generate trackable fields within the client ID to analytics of user engagement and opened DRM licenses.

In some embodiments, each HTTP request sent to content delivery system 105 may append the client ID. For example each HTTP request from client devices 150 sent to delivery server 110 may include the client ID. Alternatively, or additionally, HTTP requests from client devices 150 to alternative caching servers may include the client ID. In some embodiments, to enhance security or prevent attacks, client ID may be passed between elements of system 100 using non-standard HTTP. Moreover, in some embodiments client system 105 may validate the client ID by performing at least one of an HTTP authentication, an API key, or OAuth; and rejecting the request when the client ID is invalid.

In step 710, content delivery system 105 may determine whether one or more URLs in client devices 150 requests are unavailable. For example, upon receiving requests from client devices 150, delivery server 110 may determine whether the requested assets are available in cache memory 224. Alternatively, or additionally, delivery server 110 may associate the URLs in requests with content and segments. If the request content is not locally available, content delivery system 105 may determine the content is unavailable. For example, if the URL in the client request does not exist in delivery server 110, content delivery system 105 may determine that the request includes unavailable URLs. Thus, in some embodiments origin server 130 may be coupled to delivery server 110, which may perform operations of determining whether the content address is locally accessible and requesting the selected content from origin server 130 when determining the content address in not locally accessible.

If content delivery system 105 determines there are available URLs in the client request (step 710:no) content delivery system 105 may continue to step 712 and transmit content segments to the client device. That is, when the content request by the user is already available in delivery server 110, delivery server 110 may fetch the content from the local memory and send it the requesting client devices 150. In addition, in step 712 content delivery system 105 may update a client ID log that associates the client ID associated with the request with the licenses granted for delivery of content and specify the sent content, including for example identification for the principal and advertising content.

However, if in step 710 content delivery system 105 determines that the request includes unavailable resources or URLs (step 710: yes), content delivery system 105 may continue to step 713, generate an indication the content is not locally available, and perform a pull request. For example, if delivery server 110 determines there is an unavailable URL in the client request (step 710: yes), delivery server 110 may generate a "cache miss," indicating that the content requested by the user is not available in local memories. Delivery server 110 may respond to the "cache miss," or similar indication of unavailable content, by requesting content from a different (not local) source. For example, delivery server 110 may perform a pull request from origin server 130 to request the unavailable content. In such embodiments, the pull request may arrive at origin server 130, or equivalent content provider, as a forward or backward proxy, or other alternative implementations of a CDN origin. Alternatively, or additionally, delivery server 110 may query databases 180 for the unavailable content and/or the unavailable URL.

In some embodiments, in which the web manifest includes fake URLs, delivery server 110 will constantly find that the requested URL is unavailable. Because the manifest provides fake URLs, requests from client devices 150 may also contain fake URLs that will not be locally available, generating constantly the "cache miss." Therefore, in some embodiments, process 700 may not reach step 712 and, instead, be directed to step 713 in the decision step 710. That is, in some embodiments, content delivery system 105 may constantly determine that the client devices 150 request includes unavailable URLs.

In step 714, content delivery system 105 may resolve a client ID that came with the request. Once content delivery system 105 determines the URL is unavailable it may go through a redirection process to attempt to provide the content. As part of the redirection process, content delivery system 105 may be configured to resolve the client ID. For example, content delivery system 105 may use a secure cookie, as described for client authenticator 442 (FIG. 4), to associate the client ID with a user account. In such embodiments, origin server 130 may respond to the pull request from delivery server 110 by resolving the client ID using different authentication methods that are feasible in CDNs.

In some embodiments, security cookies used to resolve client IDs are encrypted and content delivery system 105 performs decryption functions to resolve the ID. However, in other embodiments the cookie does not require any encryption. In both embodiments, nonetheless, the cookie may be added to the request string without requiring changes in the client application, as the query could be part of the URL generated by a control panel. Further, security cookies may be generated and secured (encrypted and signed) by a server in system 100 and provide them during a session startup time. In such embodiments, the cookie used for client ID will contain real (i.e., not fictional) information because it will be associated with a specific opened session.

In step 716, based on the user account identified in step 714, content delivery system 105 may map fake URLs to real URLs that have content selected based on the client ID and the segment ID specified in the client request. For example, based on the fake URL, client ID appended to the request, and the segment requested, origin server 130 may identify a real copy of the primary content segment that should be delivered to the requesting client and a copy of the advertising content that the client should receive.

In step 718, content delivery system 105 may select advertising variants for the client ID. For example, based on the client ID and the requested segment, content delivery system 105 may identify advertisements that should be delivered to the requesting client. In such embodiments, origin server 130 may be integrated with advertising server 120 for selecting advertisements according to a selection algorithm, as further described in connection with FIG. 2. In some embodiments, the selection algorithm implemented by content system in step 716 may include adaptative or genetic algorithms to identify the most effective advertisements. In such embodiments, content delivery system 105 may transmit the client ID to advertising server 120. In turn, based on the client ID, advertising server 120 may generate and transmit selected advertising content, which may include metadata indicating the selected advertising content should be delivered to the client ID periodically.

In some embodiments, advertisement selection of step 718 may be performed independently for each segment request that comes from client devices 150. In such embodiments, origin server 130 and advertising server 120 may have dedicated ports that are opened when a user starts a session to resolve advertisements for each client request. However, in other embodiments, advertisement selection for client requests may be performed periodically based on some advertisement metadata associated with client request. For example, SCTE metadata may be stored in origin server 130 and may be used to map real content with a group of advertisements. In such embodiments, SCTE metadata may be communicated between elements of delivery system 105 (e.g., from origin server 130 to advertising server 120) to select advertising content after resolving the client ID and mapping the real content.

In step 720, content delivery system 105 may redirect the request to an address associated with the selected primary and advertising content. For example, once a client ID is identified and the origin server 130 selects the primary and advertising content that should be displayed, origin server 130 may respond to the pull request from delivery server 110 with a redirect response. For example, origin server 130 may respond with a "temporary redirect response" pointing to an address in local memory of delivery server 110 that stores the selected content. By having content delivery system 105 resolving the client ID and selecting content based on a redirect request triggered by fake URLs, content delivery system 105 may provide personalized content to client devices even though the client devices 150 have similar, or the same, manifest. This redirection within content delivery system 105 allows personalized selection of advertisements for each user/device despite the requests from client devices 150 do not include information about URL information. The redirection step also facilitates updating principal and advertising content because it centralizes the content in content delivery system 105 without having to exchange traffic between multiple servers.

In step 722, content delivery system 105 may fetch principal and/or advertising segments from the content address to which the request is redirected in step 720. For example, upon receiving a redirect response from origin server 130, delivery server 110 may fetch content from the redirected address. Thus, when the targeted redirected resource is available in an edge CDN server, which may be embodied as delivery server 110, the CDN server may find the real content for the requesting client within local memory. For example, delivery server 110 may get a redirection to a different address in cache memory 224 and fetch the content in cache memory 224. However, if the redirected address is not locally available, delivery server 110 may automatically perform a second pull request from origin server 130 to get a copy of the content. For example, if the redirected address for content is not available in a local memory of delivery server 110, such as cache memory 224, delivery server 110 may request principal content from origin server 130 and advertising content from advertising server 120.

In step 724, content delivery system 105 may transmit the content segment, with the selected primary content and/or the selected content, to the requesting client. Further, in step 724 content delivery system 105 may update a client ID log, that associates the client ID appended in the request received in step 708 with the delivered content, a user session ID, and/or DRM licenses associated with the request. This process may enable content delivery system 105 to identify suspicions content requests that may be violating content delivery system 105 policies. For example, content delivery system 105 may perform operations of generating an advertising insertion log comprising client IDs that requested advertising segments, generating a license log comprising client IDs that requested video segments, identifying an inconsistent client ID by comparing advertising insertion log with the license log, the inconsistent client ID being a client ID recorded in the license log but not recorded in the advertising insertion log, and redirecting segment requests from the inconsistent client ID to a rejection address.

With this process, content delivery system 105 takes advantage and maximizes the efficiency of the caching infrastructures frequently implemented for CDNs. For example, content delivery system 105 uses caching infrastructures provided by edge servers, local proxies, and/or the HTTP caching capability to enable personalization of content without giving the client distinguishable addresses that could be used for blocking or circumventing content. Moreover, while process 700 requires extra calls to resolve client IDs and fake URLs, the extra calls add low overhead because they are only used for redirection. In some embodiments, the content may be prepared before the request in local memories, such as delivery server memory 220. In such embodiments, the redirection of content does not generate extra content traffic and simply requires exchanges of pointers that does not significantly add latency to the request. Process 700 exploits caching and redirection capabilities of CDNs to provide personalized content and track user downloads, while hiding digital signatures that client devices 150 may use to block or screen content.

Figure 8:
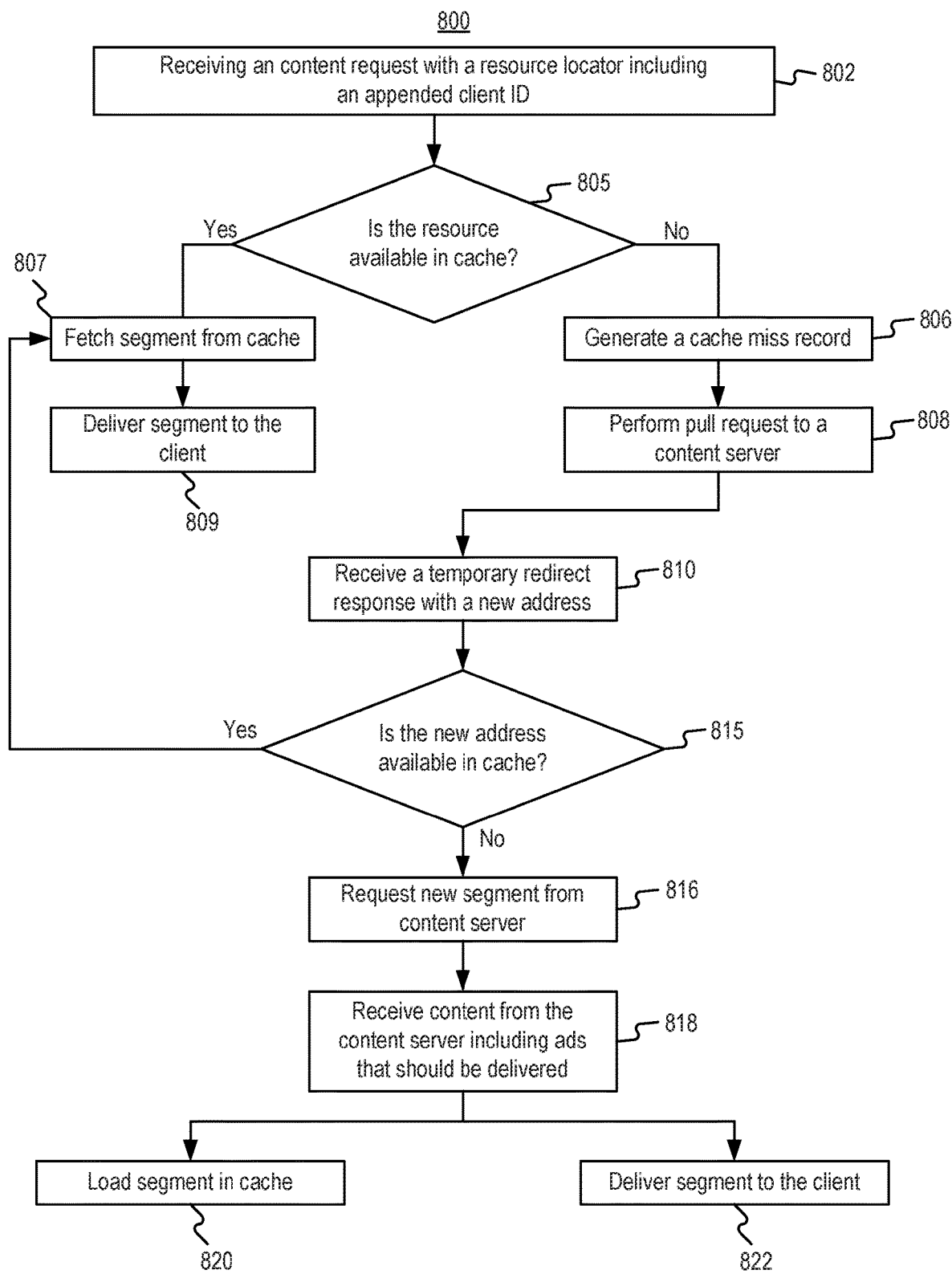
FIG. 8 is an exemplary flow chart illustrating a content request process, consistent with disclosed embodiments.

Referring now to FIG. 8, there is shown a flow chart of a request handling process 800, consistent with disclosed embodiments. Request handling process 800 may be carried out by content delivery system 105 in response to a request for content from client devices 150. For example, request handling process 800 may be carried out by delivery server 101 in response to a multimedia request from client devices 150.

In step 802, content delivery system 105 may receive a request for content from one or more of client devices 150. In some embodiments, the request may be based on the manifest delivered in step 706 (FIG. 7). Further, the request may be an HTTP request including a URL that appends a client ID. The request may also include a CDN address, specify a requested asset, and segment identification. In other embodiments, however, the request may transmit the client ID using a different channel. For example, in step 802 a client ID may be received as part of a handshake between client devices 150 and content delivery system 105.

In step 805, content delivery system 105 may determine whether the content associated with the request is available in a local memory. For example, in step 805 content delivery system 105 may determine whether a URL in the request is available in cache. As previously descried in connection with FIG. 7, in some embodiments the web manifest delivered to clients may be configured so content delivery system 105 may not find the requested URL available in cache. For example, in order to trigger redirection requests, the manifest of step 706 (FIG. 7) may purposefully include fake URLs that will not be available in cache. Nonetheless, in other embodiments, the client request may include a plurality of URLs including both valid and fake URLs. Alternatively, or additionally, the client request may include valid URLs. For example, when a user is requested unrestricted content the URL in the request may be valid.

If in step 805 content delivery system 105 determines the URL is available in local memory (step 805: yes), content delivery system 105 may continue to step 807 and fetch the segment. For example, delivery server 110 may determine that the URL in a client request is available in cache memory 224 and fetch the content to deliver the segment to the requesting client in step 809. However, if in step 805 content delivery system 105 determines the URL is unavailable in local memory (step 805: no), content delivery system 105 may continue to step 806 an generate a miss record. For example, delivery server 110 may generate a cache miss record when the URL or resource from the client request is not available in cache memory 224.

To fulfill the request, content delivery system 105 may nonetheless request the unavailable content in step 806. For example, delivery server 110 may perform a pull request to a content server, such origin server 130, to procure the content. However, in some embodiments, content delivery system 105 may be implemented in a single structure (e.g., a single server) and the pull request may simply move content from different addresses in a memory storage. For example, in step 808 content system may relocate data files from a hard drive to a cache memory.

In step 810 content delivery system 105 may receive a temporary redirect response for a new address. For example, in response to a pull request from delivery server 110, origin server 130 may resolve the client device ID, determine if the client devices can access content, and map the unavailable (or fake) URL with real content. For example, origin server 130 may identify a user account based on the client ID and a request segment based on the segment ID and use this information to associate the fake URL with a content segment. Further, origin server 130 may determine personalized advertisements that should be displayed based on the client ID. Based on this combination of client, segment, and advertising information, origin server 130 may return a redirect response addressing to indicate delivery server 110 that real video media segment or advertisement segment should be retrieved from an address in a local memory.

In step 815, content delivery system 105 may determine whether the new address is available in local memories. For example, delivery server 110 may determine whether the redirected address is available in cache memory 224. If the redirected address is available in local memory (step 815: yes), content delivery system 105 may return to step 807 fetch the segment from the cache, now retrieved from the redirected address, and deliver the segment to the client in step 809. However, if the redirected address is not available in local memory (step 815: no), content delivery system 105 may continue to step 816 and request the segment from a content server. For example, if delivery server 110 determines the redirected address is still not available in cache memory 224, delivery server 110 may automatically perform a request back to origin server 130 to upload the segment in delivery server memory 220.

In some embodiments, the request back for content is no longer associated with a fake URL, at step 815 because it was previously redirected, and the content delivery system 105 may transmit the content for delivery to requesting client devices 150. For example, origin server 130 may receive the request back and send the content to delivery server 110 in step 816. Because in some situations the new address or requested content may not be available in the cache after redirection in step 810, the content may be uploaded to the cache in step 816. Accordingly, origin server 130 may create a copy of the requested primary and advertising content and send it to delivery server 110. Thus, in step 818, content delivery system 105 may receive requested content. For example, in step 818 delivery server 110 may receive content and/or advertising segments from origin server 130.

In step 820, content delivery system 105 may store the retrieved content in local memory for future requests. For example, delivery server 110 may store the content received from origin server 130 in cache memory 224 to prepare for future requests and minimize latency. In some embodiments, however, delivery server 110 may choose to store content in cache memory 224 only after a number of requests have requested that content. For example, delivery server 110 may store new content in cache memory 224 only after a threshold number of client requests for the new content.

In step 822, content delivery system 105 may deliver the segment to requesting client. For example, delivery server 110 may transmit to client devices 150 the content received from origin server. In some embodiments, the content may include principal and advertising segments. However, because the content may be bundled in a single address that is cannot be distinguished by the client, advertisement blockers cannot differentiate content from advertisements.

Figure 9:
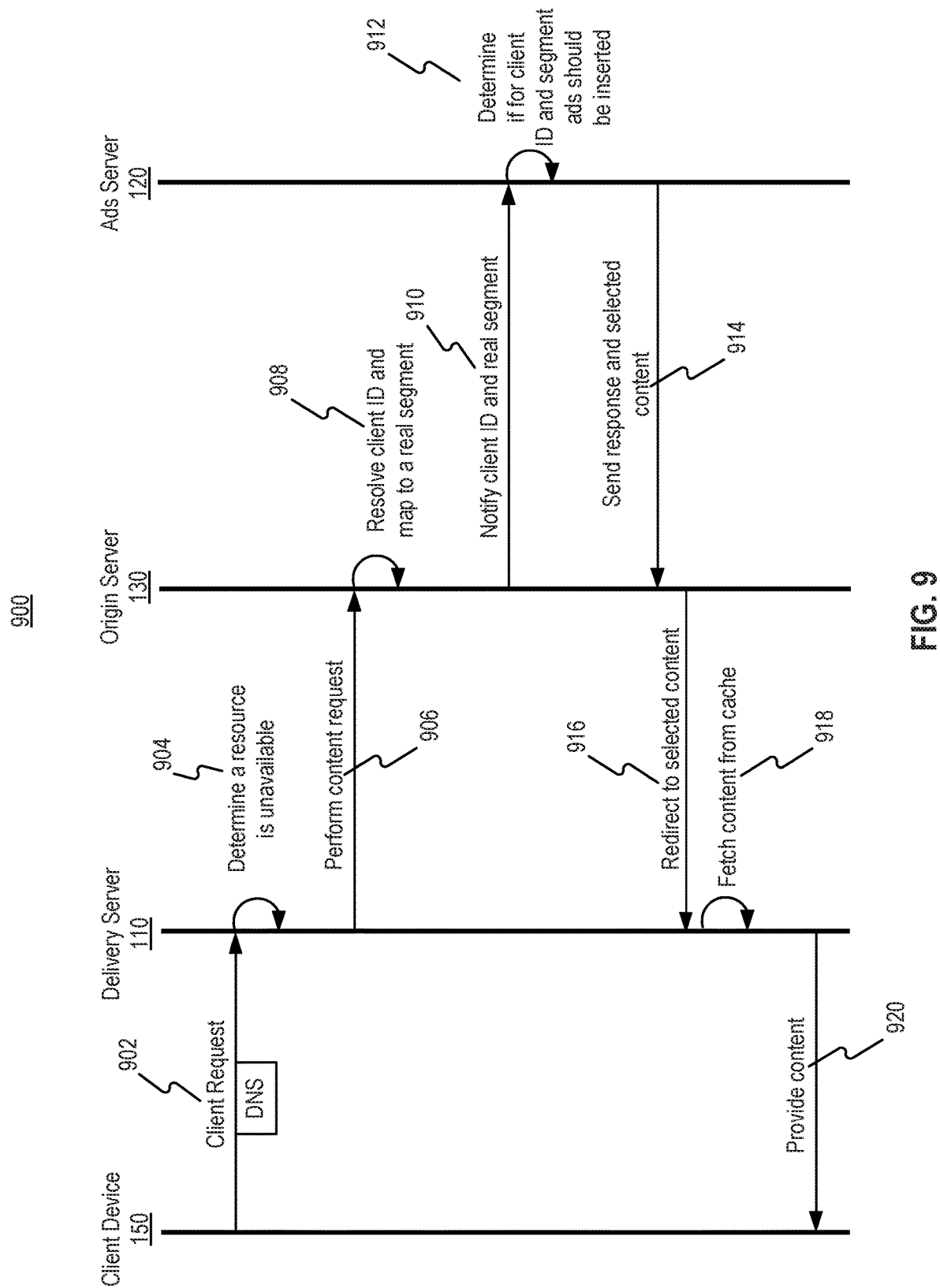
FIG. 9 is an exemplary process flow diagram for processing a content request, consistent with disclosed embodiments

Referring now to FIG. 9, there is shown a process flow diagram for processing a content request, consistent with disclosed embodiments. As shown in FIG. 9, process flow 900 may be implemented between client devices 150 and elements of content delivery system 105, including delivery server 110, origin server 130, and advertising server 120. In other embodiments, however, additional elements of system 100 (FIG. 1) can be incorporated to process flow 900. For example, online resources 140 may perform some steps of process flow 900. Further, in some embodiments process flow 900 may be implemented by fewer elements of system 100, for example process flow 900 may be executed between delivery server 110 and client devices 150 only.

As previously described in connection with FIG. 7, in some embodiments some steps not shown in process flow 900 may be performed in preparation to processing a client request. For example, advertising server 120 may prepare advertisement variants for different user profiles and/or configurations and transmit them to delivery server 110. Additionally, in other embodiments, origin server 130 may send content, including signaling for ads, to delivery server 110 to store in a cache memory. Further, delivery server 110 may transmit web manifest to client devices 150 before receiving the client requests. These preparation steps, not shown in FIG. 9, may be executed by system 100 to facilitate responding to client requests.

In step 902, client devices 150 may transmit a request to delivery server 110. For example, client devices 150 may transmit an HTTP request for a content segment. In some embodiments, the request may append a client ID and a segment ID. Further, the request may include a URL as specified in the manifest, which may include fake URLs. In some embodiments, the request may describe domain names and the request may be redirected by a DNS server to delivery server 110.

In step 904, delivery server 110 may determine whether URLs in the client request are valid or are available. For example, delivery server 110 may determine whether the URL or requested resource is in cache, or if it is existent in content delivery system 105. In some embodiments, because the web manifest may include fake URLs and client requests may be based on the manifest, deliver server 110 may determine that the URL is invalid and perform a content request from origin server 130 in step 906. For example, delivery server 110 may have a "cache miss" for advertisements and perform a pull request from origin server 130.

In step 908, origin server 130 may resolve a client ID and map a real segment based on the information in the invalid resource request. For example, origin server 130 may use a secure cookie, or an equivalent technique for authentication, to identify a user account associated with the client ID embedded in the client request. Further, origin server 130 may map received fake URLs to real principal and advertising segment in step 908.

In step 910, origin server 130 may notify the client ID and the real segment to advertising server 120. In turn, advertising server 120 may determine if for the client ID and the requested segment advertisements should be inserted. For example, advertising server 120 may perform an advertisement selection algorithm to determine if advertisements should be presented and select advertisements, as further disclosed in connection with FIG. 3. In some embodiments, origin server 130 may be integrated with advertising server 120 and select advertisements according to an advertisement selection algorithm.

In step 914, advertising server 120 may send a response with selected content to origin server 130. For example, advertising server 120 may respond to origin server 130 with a group of selected advertisements or an indication that no advertisements should be presented to the client device 150. In step 916, origin server 130 may respond to deliver server 110 request with a redirection such as a "temporary redirect response (302)" or "302 Found (HTTP 1.1)/Moved Temporarily (HTTP 1.0)." Alternatively, or additionally, origin server may respond with a "301 Moved Permanently" response or a "307 Moved Temporarily." The redirection may point to a new address in a local memory of delivery server 110, such as cache memory 224.

In step 918, delivery server 110 may retrieve the content from the redirection address and in step 920, delivery server 110 may provide the content to the requesting client device 150.

Figure 10:
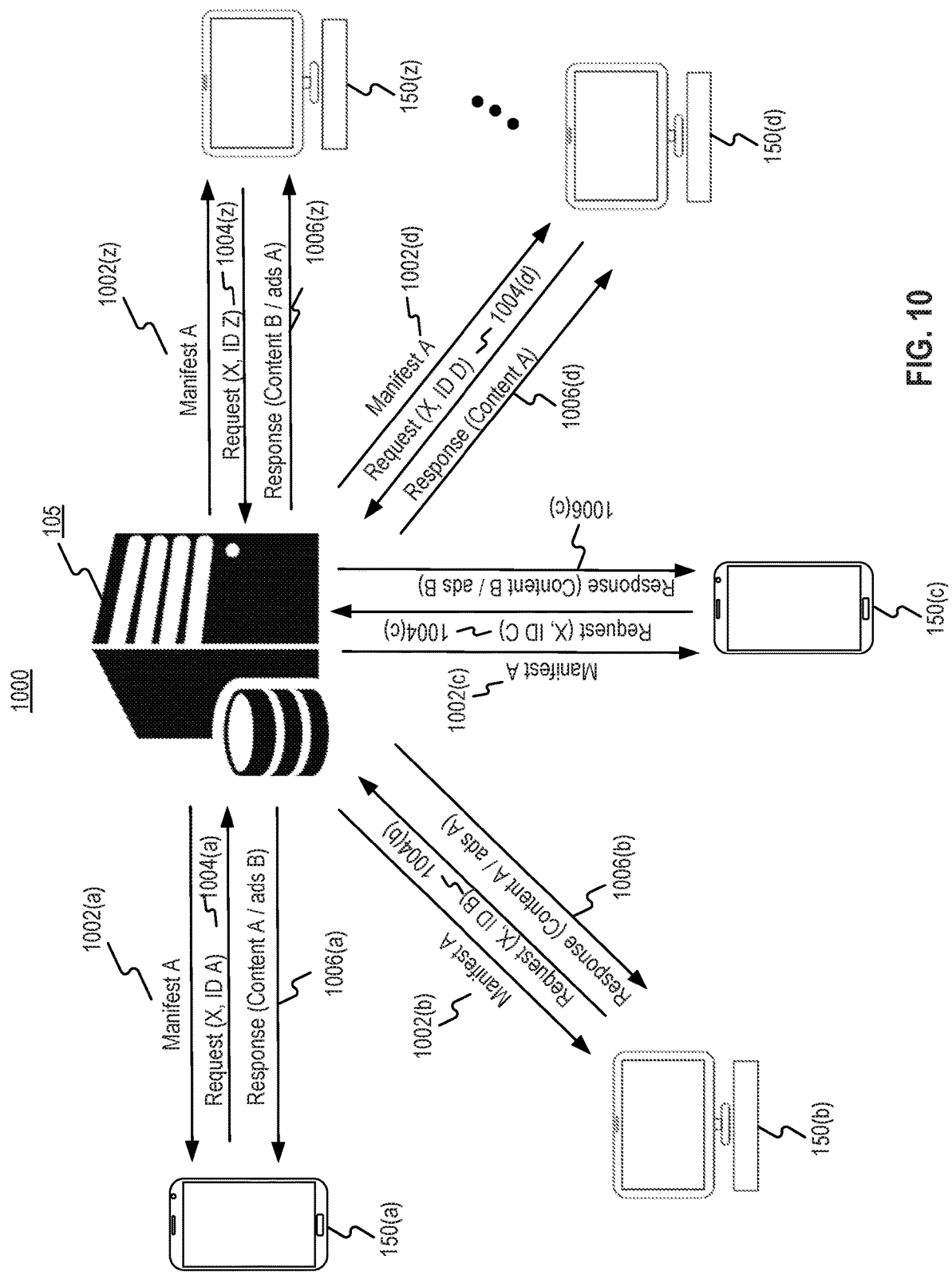
FIG. 10 is an exemplary schematic showing a representation of content delivery, consistent with disclosed embodiments.

FIG. 10 shows an exemplary schematic showing a representation of content delivery, consistent with disclosed embodiments. Schematic FIG. 10 shows that content delivery system 105 communicates with a plurality of client devices 150(a)-150(z). Client devices 150 may have a plurality of operating systems and different user privileges. Literals used to reference individual elements in FIG. 10, e.g., (a), (b), or (z), do not specify the number of an element or the total number of elements. Instead, they are variable references that indicate a variable element number and a variable number of total elements. For example, literal (z) used to reference client device 150(z) does not indicate that device (z) is the 26$^{th}$ device. Instead, (z) is a variable reference that could indicate any integer number. Therefore, sample device (z) is any one of client devices 150. Similarly, literals (a) and (b) used to reference, for example, client device 150(a), are also variable references that do not indicate or limit the element number or the total number of elements.

FIG. 10 shows content delivery system 105 may initially send manifests 1002 to client devices 150. As shown in FIG. 10, each one of the manifests 1002 may be the same (Manifest A). For example, manifests 1002(a)-(z) may be the same so client devices 150 do not have any means to distinguish between manifests 1002. In such embodiments, manifests 1002 may not include a place holder for advertisements or references to advertisements segments. This may prevent advertisement blockers from inhibiting advertisement displays. Further, as shown in FIG. 10, even though client devices may have different personalized advertisements or may be exempt from advertisements, the same manifests 1002 are sent to client devices 150. For example, each one of client devices 150 may receive the same, or indistinguishable, EXTM3U file. Such arrangement prevents the disclosure of digital signatures of advertisements to client devices 150.

Client devices 150 may send request 1004 to content delivery system 105 to obtain multimedia content, such as videos or movies. As previously described in connection with FIGS. 7-8, requests 1004 may be generated based on manifests 1002. The request may include a URL that is invalid, based on manifests 1002 instructions, and may append a client ID. For example, client device 150(a) may generate a HTTP request 1004(a) with a URL "X" as described by manifest 1002(a) and append to the request an "ID A," which is associated with the client device 150(a). Similarly, when client device 150(b) wants to receive content from content delivery system 105, client device 150(b) may generate a HTTP request 1004(b) with a URL that specifies content delivery system 105 address, a segment, an asset, bit rate and a client ID. For example, based on manifest 1002(*b*), client device 150(*b*) may generate request 1004(*b*) using a format of "https:\\address\asset\bitrate\segmentID." Other requests 1004 may request the same or different assets and/or bitrates, but each request 1004 would include the corresponding client identification. As graphically shown in FIG. 10, each one of requests 1004 include append client IDs such as "ID A"-"ID Z."

In response to requests 1004, content delivery system 105 may perform operations described above in connection to FIGS. 7-8, to determine the content that should be delivered to respective client devices 150. Using the client IDs and redirection features in the servers of content delivery system 105, content delivery system 105 may identify the content that should be provided to the particular client device. For example, even though the URL in request 1004(*a*) may be invalid, using "ID A" and segment identification in request 1004(*a*), content delivery system 105 may identify which content should be provided to client device 150(*a*) and whether advertisements should be displayed for client device 150(*a*). Then, using redirecting operation within servers of content delivery system 105, content delivery system 105 may retrieve and provide the selected principal content and advertisements to client device 150(*a*). By using the redirecting features of the server and the appended client ID, content delivery system 105 may personalize content even though the manifests 1002 do not include any distinguishable information.

Accordingly, in response to requests 1004, content delivery system 105 may provide personalized responses 1006 to each one of client devices 150. For example, although client device 150(*a*) and client device 150(*b*) may have the same manifest 1002, content delivery system 105 may return personalized response 1006(*a*) including content A and advertisements B for client device 150(*a*) but return personalized response 1006(*b*) including content A and advertisements A for client device 150(*b*). Similarly, in some embodiments the same manifests 1002 may have been delivered to client devices 150(*c*)-150(*z*). However, each client receives a different personalized response 1006, with client device 150(*c*) receiving content B and advertisements (b), client device 150(*d*) receiving content A only (representing a user exempt of ads), client device (z) receiving content B and advertisements A. Content delivery system 105 thus delivers personalized content while preventing detection of advertisement segments that are exploited by advertisement blockers. Accordingly, with this arrangement an OTT service may implement content delivery system 105 and continue utilizing DAI technology with a scalable and affordable solution that is not exposed to potential blocks.

FIG. 11 shows exemplary source code for a manifest configuration, consistent with disclosed embodiments. Manifest source code 1100 shows exemplary instructions and functions that may be employed to generate the manifest, as described in connection with FIG. 7 and/or manifests 1002 (FIG. 10). The syntax used in source code 1100 is exemplary and different syntaxis and functions can be also employed and/or substituted.

Manifest source code 1100 includes a header 1101. Header 1101 may include EXTM3U which may indicate the playlist is an extended M3U file. Header 1101 may also include an EXT-X-PLAYLIST-TYPE to provide mutability information that applies to the entire playlist file. In some embodiments, EXT-X-PLAYLIST-TYPE may contain a value of either EVENT or VOD. Header 1101 may also include an EXT-X-TARGETDURATION, specifying the maximum media-file duration and an EXT-X-VERSION indicating the compatibility version of the playlist file. The playlist media and its server must comply with all provisions of the most recent version of the IETF Internet-Draft of the HTTP Live Streaming specification that defines that protocol version. Header 1101 may also include an EXT-X-MEDIA-SEQUENCE indicating the sequence number of the first URL that appears in a playlist file. Further, an EXTINF in header 1101 may record marker that describes the media file identified by the URL that follows it. In some embodiments, EXTINF may contain a duration attribute that's an integer or floating-point number in decimal positional notation that specifies the duration of the media segment in seconds. This value must be less than or equal to the target duration.

Manifest source code 1100 may include URLs 1102. URLs may include CDN addresses, assets, and sequences. In some embodiments, URLs 1102 may include fake URLs to trigger the redirection process described in connection to FIGS. 7-8. Further, manifest source code 1100 may include closing tags 1103 such as EXT-X-ENDLIST, indicating that no more media files will be added to the playlist file.

Moreover, in some embodiments manifest source code 1100 may include instructions to incorporate advertisements into a playlist. Advertising tags 1104 may include a plurality of instructions to inform client devices of a change that is coming to the streaming media. For example, advertising tags 1104 may include functions, such as EXT-X-TARGET-DURATION, specifying a maximum media-file duration. Further, advertising tags 1104 may include tags for synchronization between different variant streams or different renditions of the same variant stream.

Another aspect of the disclosure is directed to a non-transitory computer-readable medium storing instructions that, when executed, cause one or more processors to perform the methods, as discussed above. The computer-readable medium may include volatile or non-volatile, magnetic, semiconductor, tape, optical, removable, non-removable, or other types of computer-readable medium or computer-readable storage devices. For example, the computer-readable medium may be the storage unit or the memory module having the computer instructions stored thereon, as disclosed. In some embodiments, the computer-readable medium may be a disc or a flash drive having the computer instructions stored thereon.

It will be apparent to those skilled in the art that various modifications and variations can be made to the disclosed system and related methods. Other embodiments will be apparent to those skilled in the art from consideration of the specification and practice of the disclosed system and related methods. It is intended that the specification and examples be considered as exemplary only, with a true scope being indicated by the following claims and their equivalents.

Moreover, while illustrative embodiments have been described herein, the scope thereof includes any and all embodiments having equivalent elements, modifications, omissions, combinations (e.g., of aspects across various embodiments), adaptations and/or alterations as would be appreciated by those in the art based on the present disclosure. For example, the number and orientation of components shown in the exemplary systems may be modified. Further, with respect to the exemplary methods illustrated in the attached drawings, the order and sequence of steps may be modified, and steps may be added or deleted.

Thus, the foregoing description has been presented for purposes of illustration only. It is not exhaustive and is not limiting to the precise forms or embodiments disclosed.

Modifications and adaptations will be apparent to those skilled in the art from consideration of the specification and practice of the disclosed embodiments.

The claims are to be interpreted broadly based on the language employed in the claims and not limited to examples described in the present specification, which examples are to be construed as non-exclusive. Further, the steps of the disclosed methods may be modified in any manner, including by reordering steps and/or inserting or deleting steps.

What is claimed is:

1. A system for multimedia content delivery comprising:
one or more processors; and
a storage medium storing instructions that, when executed, configure the one or more processors to perform operations comprising:
  delivering secure cookies to a set of client devices at session startups;
  delivering to the set of client devices a manifest comprising fake segment URLs, the fake segment URLs being configured to trigger the one or more processors to redirect requests to bundled addresses bundling advertising and primary content in a single address;
  receiving, from a client device of the set of client devices, a segment request comprising and a requested URL and an encrypted secure cookie based on at least one of the secure cookies, the requested URL being one of the fake segment URLs, the encrypted secure cookie specifying an opened session and being stringed to the segment request;
  resolving a client ID by decrypting the secure cookie;
  after resolving the client ID, selecting content for the client device based on the client ID when determining the requested URL is unavailable;
  redirecting the segment request to at least one of the bundled addresses comprising the selected content; and
  providing the selected content to the client device.

2. The system of claim 1, wherein
the manifest is a legitimate master web manifest that does not include proprietary tags.

3. The system of claim 1, further comprising:
a cache memory coupled to the one or more processors, and
wherein the requested URL is determined to be unavailable when the requested URL is not found in the cache memory.

4. The system of claim 1, wherein the selected content includes at least one of a video segment or an advertisement segment.

5. The system of claim 1, further comprising:
an origin server coupled to the one or more processors; and
wherein the operations further comprise:
  determining whether the content address is locally accessible; and
  requesting the selected content from the origin server when determining the content address in not locally accessible.

6. The system of claim 5, wherein the operations further comprise:
performing a pull request from the origin server when determining the requested URL is unavailable; and
receiving, from the origin server, a redirect response comprising the selected content address.

7. The system of claim 5, wherein the operations further comprise:
receiving, from the origin server, a plurality of video segments, each of the plurality of video segments being associated with metadata for advertising signaling; and
storing the plurality of video segments in the cache memory.

8. The system of claim 5, further comprising:
an advertising server coupled to the one or more processors,
wherein the operations further comprise:
  receiving, from the advertising server, a plurality of advertising segments, each of the plurality of advertising segments being associated with a client category, a bitrate, and a resolution; and
  storing the plurality of advertising segments in the cache memory.

9. The system of claim 8, wherein selecting content comprises:
transmitting the client ID to the advertising server; and
receiving selected advertising content from the advertising server, the selected advertising content including metadata indicating the selected advertising content should be delivered to the client ID periodically.

10. The system of claim 1, wherein the operations further comprise:
validating the client ID by performing at least one of an HTTP authentication or an API key; and
rejecting the request when the client ID is invalid.

11. The system of claim 1, wherein the operations further comprise:
generating an advertising insertion log comprising client IDs that requested advertising segments;
generating a license log comprising client IDs that requested video segments;
identifying an inconsistent client ID by comparing the advertising insertion log with the license log, the inconsistent client ID being a client ID recorded in the license log but not recorded in the advertising insertion log; and
redirecting segment requests from the inconsistent client ID to a rejection address.

12. The system of claim 1, wherein the same manifest is delivered to each one of the client devices associated with the system for multimedia content delivery.

13. The system of claim 1, wherein
the segment request further comprises:
  a CDN address,
  an asset identification, and
  a bitrate identification.

14. The system of claim 13, wherein the manifest comprises an HTTP Live Streaming (HLS) manifest comprising a plurality of URLs and a Plurality of discontinuity tags.

15. A non-transitory computer-readable medium storing instructions that, when executed by a processor, cause the processor to operate a system for multimedia content delivery, the operations comprising:
delivering secure cookies to a set of client devices at session startups;
delivering to the set of client devices a manifest comprising fake segment URLs, the fake segment URLs being configured to trigger the one or more processors to redirect requests to bundled addresses bundling advertising and primary content in a single address;
receiving, from a client device of the set of client devices, a segment request comprising and a requested URL and an encrypted secure cookie based on at least one of the secure cookies, the requested URL being one of the fake segment URLs, the encrypted secure cookie specifying an opened session and being stringed to the segment request;

resolving a client ID by decrypting the secure cookie;

after resolving the client ID, selecting content for the client device based on the client ID when determining the requested URL is unavailable;

redirecting the segment request to at least one of the bundled addresses comprising the selected content; and providing the selected content to the client device.

16. The non-transitory computer-readable medium of claim 15, wherein the requested URL is determined to be unavailable when the requested URL is not found in cache memory.

17. A computer-implemented method for multimedia content delivery, the method comprising:

delivering secure cookies to a set of client devices at session startups;

delivering to the set of client devices a manifest comprising fake segment URLs, the fake segment URLs being configured to trigger the one or more processors to redirect requests to bundled addresses bundling advertising and primary content in a single address;

receiving, from a client device of the set of client devices, a segment request comprising a requested URL and an encrypted secure cookie based on at least one of the secure cookies, the requested URL being one of the fake segment URLs, the encrypted secure cookie specifying an opened session and being stringed to the segment request;

resolving a client ID by decrypting the secure cookie;

after resolving the client ID, selecting content for the client device based on the client ID when determining the requested URL is unavailable;

redirecting the segment request to at least one of the bundled addresses comprising the selected content; and providing the selected content to the client device.

18. The computer-implemented method of claim 17, wherein the requested URL is determined to be unavailable when the requested URL is not found in cache memory.

19. The system of claim 1, wherein the manifest delivered to each of the client devices is the same and indistinguishable between the client devices.

20. The system of claim 19, wherein the set of client devices comprise client devices exempt of advertisements and client devices unexempt of advertisements; and the manifest comprises a header comprising an EXTM3U file that is identical for each of the client devices.

* * * * *